United States Patent
Shriber et al.

(10) Patent No.: US 11,436,292 B2
(45) Date of Patent: Sep. 6, 2022

(54) GEOGRAPHIC LOCATION BASED FEED

(71) Applicant: NEWSPLUG, INC., New York, NY (US)

(72) Inventors: John S. Shriber, New York, NY (US); Roman Zaks, New York, NY (US)

(73) Assignee: NEWSPLUG, INC., New York, NY (US)

( * ) Notice: Subject to any disclaimer, the term of this patent is extended or adjusted under 35 U.S.C. 154(b) by 111 days.

(21) Appl. No.: 16/110,000

(22) Filed: Aug. 23, 2018

(65) Prior Publication Data

US 2020/0065398 A1 Feb. 27, 2020

(51) Int. Cl.
*G06F 16/9537* (2019.01)
*G06F 16/9535* (2019.01)
*G06N 20/00* (2019.01)

(52) U.S. Cl.
CPC ...... *G06F 16/9537* (2019.01); *G06F 16/9535* (2019.01); *G06N 20/00* (2019.01)

(58) Field of Classification Search
CPC ...... G06F 16/29; G06F 16/74; G06F 16/4393; G06F 3/0481; G06F 16/783
See application file for complete search history.

(56) References Cited

U.S. PATENT DOCUMENTS

| | | |
|---|---|---|
| 6,199,081 B1 | 3/2001 | Meyerzon et al. |
| 6,718,365 B1 | 4/2004 | Dutta |
| 7,117,432 B1 | 10/2006 | Shanahan et al. |
| 7,174,346 B1 | 2/2007 | Gharachorloo et al. |
| 7,216,290 B2 | 5/2007 | Goldstein et al. |
| 7,613,769 B1 | 11/2009 | Hess |
| 7,617,190 B2 | 11/2009 | Wright et al. |
| 7,634,535 B2 | 12/2009 | Watson |
| 7,640,184 B1 | 12/2009 | Lunt |
| 7,669,123 B2 | 2/2010 | Zuckerberg et al. |
| 7,734,610 B2 | 6/2010 | Rakowski et al. |
| 7,957,723 B2 | 6/2011 | Punaganti Venkata et al. |
| 7,958,115 B2 | 6/2011 | Kraft |
| 7,971,147 B2 | 6/2011 | Subbarao et al. |
| 7,984,056 B1 | 7/2011 | Kane |
| 8,037,093 B2 | 10/2011 | Tiu, Jr. et al. |
| 8,082,288 B1 | 12/2011 | Yeh et al. |
| 8,276,079 B2 | 9/2012 | Davar et al. |

(Continued)

OTHER PUBLICATIONS

International Search Report and Written Opinion, PCT/US19/47349, dated Nov. 12, 2019.

*Primary Examiner* — Cheyne D Ly
(74) *Attorney, Agent, or Firm* — Greenberg Traurig

(57) ABSTRACT

Technologies for implementing geographic location based news feeds. A server computer indexes web content transmitted from a first client computer. And, the server computer, in response to receiving a search query from a second client computer, generates geographically filtered search results based on the search query from the second client computer and a geographic location tag of the search query. The geographically filtered search results can include parts of the web content transmitted from a first client computer corresponding to the search query and the geographic location tag of the search query. The server computer also transmits the geographically filtered search results to the second client computer to be displayed by the second client computer.

19 Claims, 19 Drawing Sheets

(56) References Cited

U.S. PATENT DOCUMENTS

| | | | |
|---|---|---|---|
| 8,290,926 B2 | 10/2012 | Ozzie et al. | |
| 8,589,391 B1 | 11/2013 | Reynar et al. | |
| 8,589,418 B1 | 11/2013 | Kane | |
| 8,601,055 B2 | 12/2013 | Smith et al. | |
| 8,606,845 B2 | 12/2013 | Dickinson et al. | |
| 8,655,873 B2 * | 2/2014 | Mitchell | H04W 4/185 707/724 |
| 8,667,385 B1 | 3/2014 | Mui et al. | |
| 8,874,541 B1 | 10/2014 | Vandehey et al. | |
| 9,032,000 B2 * | 5/2015 | Barrington | G06Q 10/10 707/804 |
| 9,058,391 B2 | 6/2015 | Shriber et al. | |
| 9,338,215 B2 | 5/2016 | Shriber et al. | |
| 9,432,253 B1 * | 8/2016 | Johansson | H04L 41/08 |
| 9,740,794 B2 | 8/2017 | Bhumkar et al. | |
| 9,747,285 B1 * | 8/2017 | Laufer | G06F 16/29 |
| 9,977,800 B2 | 5/2018 | Shriber et al. | |
| 2002/0194611 A1 | 12/2002 | Hodgkinson | |
| 2003/0233422 A1 | 12/2003 | Csaszar et al. | |
| 2004/0019611 A1 | 1/2004 | Pearse et al. | |
| 2005/0165615 A1 | 7/2005 | Minar | |
| 2005/0210514 A1 * | 9/2005 | Kittlaus | H04L 29/06027 725/81 |
| 2005/0289468 A1 | 12/2005 | Kahn et al. | |
| 2006/0073812 A1 | 4/2006 | Punaganti Venkata et al. | |
| 2006/0095507 A1 | 5/2006 | Watson | |
| 2006/0167860 A1 | 7/2006 | Eliashberg et al. | |
| 2006/0173985 A1 | 8/2006 | Moore | |
| 2006/0184617 A1 | 8/2006 | Nicholas et al. | |
| 2006/0190616 A1 | 8/2006 | Mayerhofer et al. | |
| 2006/0217126 A1 | 9/2006 | Sohm et al. | |
| 2006/0230061 A1 | 10/2006 | Sample et al. | |
| 2007/0043617 A1 | 2/2007 | Stein et al. | |
| 2007/0083520 A1 | 4/2007 | Shellen et al. | |
| 2007/0083536 A1 | 4/2007 | Darnell et al. | |
| 2007/0118794 A1 | 5/2007 | Hollander et al. | |
| 2007/0156809 A1 | 7/2007 | Dickinson et al. | |
| 2007/0174389 A1 | 7/2007 | Armstrong et al. | |
| 2007/0198526 A1 | 8/2007 | Pitkow | |
| 2007/0225047 A1 | 9/2007 | Bakos | |
| 2007/0266338 A1 | 11/2007 | Shirai | |
| 2008/0021880 A1 | 1/2008 | Ren et al. | |
| 2008/0028181 A1 | 1/2008 | Tong et al. | |
| 2008/0059444 A1 | 3/2008 | Singh et al. | |
| 2008/0071929 A1 | 3/2008 | Motte et al. | |
| 2008/0082904 A1 | 4/2008 | Martinez et al. | |
| 2008/0126476 A1 | 5/2008 | Nicholas et al. | |
| 2008/0215589 A1 | 9/2008 | Elhaik | |
| 2008/0235594 A1 | 9/2008 | Bhumkar et al. | |
| 2008/0256443 A1 | 10/2008 | Li et al. | |
| 2008/0294632 A1 | 11/2008 | Chang et al. | |
| 2008/0313215 A1 | 12/2008 | Beker et al. | |
| 2009/0144272 A1 | 6/2009 | Adarsh et al. | |
| 2009/0217196 A1 | 8/2009 | Neff et al. | |
| 2009/0271388 A1 | 10/2009 | Murdock et al. | |
| 2009/0299824 A1 | 12/2009 | Barnes, Jr. | |
| 2010/0011282 A1 | 1/2010 | Dollard et al. | |
| 2010/0023506 A1 | 1/2010 | Sahni et al. | |
| 2010/0088170 A1 | 4/2010 | Glore, Jr. | |
| 2010/0125541 A1 | 5/2010 | Wendel et al. | |
| 2010/0199340 A1 | 8/2010 | Jonas et al. | |
| 2010/0205167 A1 * | 8/2010 | Tunstall-Pedoe | G06F 16/24 707/706 |
| 2010/0257184 A1 | 10/2010 | Uy | |
| 2010/0262597 A1 | 10/2010 | Han | |
| 2010/0280860 A1 | 11/2010 | Iskold et al. | |
| 2010/0312771 A1 | 12/2010 | Richardson et al. | |
| 2010/0313252 A1 | 12/2010 | Trouw | |
| 2011/0043652 A1 | 2/2011 | King et al. | |
| 2011/0161413 A1 | 6/2011 | Cierniak et al. | |
| 2011/0179020 A1 | 7/2011 | Ozzie et al. | |
| 2011/0184960 A1 | 7/2011 | Delpha et al. | |
| 2011/0238508 A1 | 9/2011 | Koningstein | |
| 2011/0252041 A1 | 10/2011 | Broman | |
| 2011/0258526 A1 | 10/2011 | Supakkul et al. | |
| 2012/0102048 A1 | 4/2012 | Heer | |
| 2012/0158753 A1 | 6/2012 | He et al. | |
| 2012/0159635 A1 | 6/2012 | He et al. | |
| 2012/0166453 A1 | 6/2012 | Broder | |
| 2012/0239639 A1 | 9/2012 | Shriber et al. | |
| 2012/0240030 A1 | 9/2012 | Shriber et al. | |
| 2012/0240053 A1 * | 9/2012 | Shriber | G06F 16/9535 715/749 |
| 2014/0013353 A1 | 1/2014 | Mathur | |
| 2014/0180943 A1 | 6/2014 | Priddy, Jr. et al. | |
| 2015/0256591 A1 | 9/2015 | Shriber et al. | |
| 2016/0239526 A1 | 8/2016 | Shriber et al. | |
| 2018/0268006 A1 | 9/2018 | Shriber et al. | |

* cited by examiner

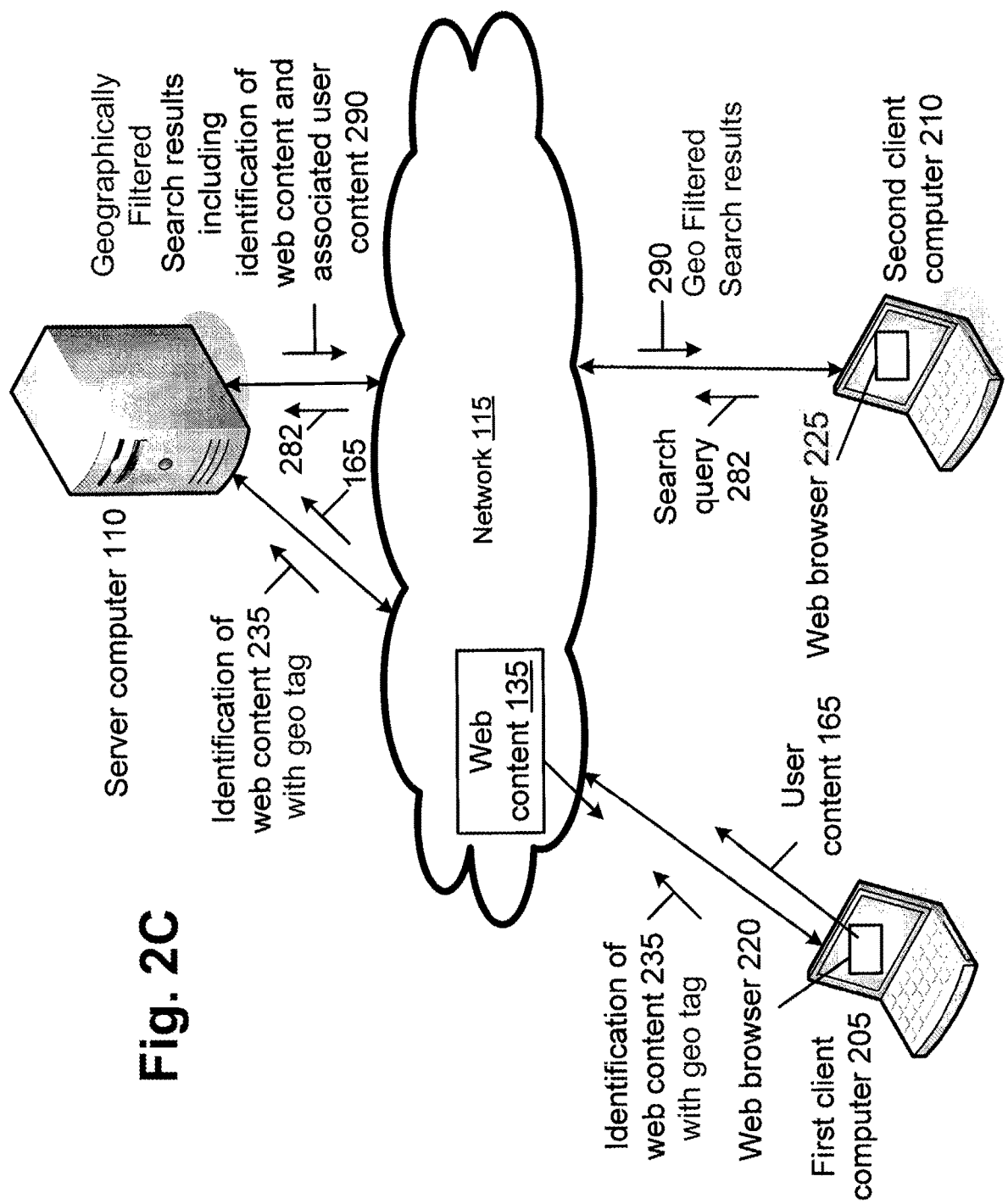

Roomster

Roomster - the best service since features & largest community on Shares, Apartments & Sublets. A every minute!

Check out our blog! sign up for a free account or sign in

Post your vacancies for free Are you an apartment manager, broker, owner or sub-lessor? Post your rentals for Free. Add, Edit or Delete them with 24hr access Sign up for a free account or sign in

NEWSPLUG

@roomster.com

Welcome to Roomster Reviews. Find reviews, comments, and updates about Roomster and Roommates. We are the world's largest online social network, the largest community http://www.roomster.com/

☐ Anonymize  👍 Like  👎 Dislike  = Neutral  ☑ Share syria
suicide
attack
kills
bombings 0 comments    0 likes   0 dislikes BBC http://www.roomster.com/ roommate search service, ro... X roommate search service, roommate finder, roommates wanted - Internet Explorer, opimized for Bing and MSN

Fig. 4C (rotated browser window mockup)

roommate search service, roommate finder, roommates wanted - Internet Explorer, opimized for Bing and MSN BBC http://www.roomster.com/ roommate search service, ro... X

← 450

SW  Roomster.com

1st 1 comments    1 likes  0 dislikes

Roomster
Roomster - the best service since
features & largest community on Shares, Apartments & Sublets.
A
every minute!

Check out our blog!
sign up for a free account or sign in

Post your vacancies for free
Are you an apartment manager, broker, owner or sub-lessor?
Post your rentals for Free.
Add, Edit or Delete them with 24hr access
Sign up for a free account or sign in

NEWSPLUG

@roomster.com
Welcome to Roomster Reviews  Find reviews, comments, and updates about Roomster and Roommates.  We are the world's largest online social network, the largest community
http://www.roomster.com/

445
425

1 comment                    1 like  0 dislikes

Wan Di
Dec 19, 12:45 AM    awesome! i cannot believe it i love it sooooo much  455

Like   Dislike   = Neutral   Share

ADDED TO S
SLANGWHO SEARCH:

syria
suicide
attack
kills
bombings

← 460

| roommate search service, roommate finder, roommates wanted - Internet Explorer, opimized for Bing and MSN |

BBC http://www.roomster.com/

SW  Roomster.com | roommate search service, ro... X

Check-in

Roomster

Roomster - the best service since features & largest community on Shares, Apartments & Sublets. A every minute!

Check out our blog! sign up for a free account or sign in

Post your vacancies for free Are you an apartment manager, broker, owner or sub-lessor? Post your rentals for Free. Add, Edit or Delete them with 24hr access Sign up for a free account or sign in

NEWSPLUG

@roomster.com
Welcome to Roomster Reviews. Find reviews, comments, and updates about Roomster and Roommates. We are the world's largest online social network, the largest community
http://www.roomster.com/

← 425

2 comments    1 likes   1 dislikes 2 comment    1 like   1 dislikes

Wan Di
Dec 19, 12:45 AM
awesome!, i cannot believe it i love it sooooo much  ← 455

John Shriber
Dec 20, 9:34 PM
this is really too bad  ← 465

Like  Dislike  = Neutral  Share

ADDED TO S
SLANGWHO SEARCH:
syria
suicide
attack
kills
bombings

Fig. 4D

GEOGRAPHIC LOCATION BASED FEED

FIELD

The present disclosure relates to online content feeds, and more specifically to geographic location based content feeds.

BACKGROUND

Web content accessible via the Internet includes web pages, videos, photographs, blogs, news, media, songs, etc. Communication about web content between individuals is typically done via email, blog post, or via a social networking site. Searching the web for web content is performed by search engines. Search engines, such as GOOGLE® and BING®, typically use bots or web crawlers to follow links in web pages to discover content, index the content, and then sort the indexed content through an algorithm.

Geolocation is the identification or estimation of geographic location of an object, such as a mobile phone or Internet-connected computer terminal. In general, geolocation includes the generation of information related to geographic coordinates or general geographic location such as a known address. Geolocation is related to use of positioning systems, and it is particularly useful in that in some examples such a position system is enhanced by geographic coordinates. Such coordinates can be used to determine meaningful locations such as a street address.

SUMMARY

The process employed by typical search engines to generate search results may not accurately reflect the interest of users on the web including interests relative to geographic location. Also, the process employed by typical search engines to generate search results may not accurately reflect the geographic location associated with each search result. A conventional search engine follows links in web pages to locate web content, indexes the content, and then sorts the indexed content through a complex algorithm which may indirectly take into account the interest of the web users and the geographic location associated with each search result.

Also, there remains a need, to enable real-time communication between a first user and a second user about web content relative to geographic location displayed by a web browser to enable the second user to receive at least some of the web content relative to geographic location of the first user and/or the second user. Communication can include geographic location filtered comments on the web content, geographic location filtered tips related to the web content, etc.

Searching and communications through electronic devices can be enhance by geolocation and other types of positioning systems such as a global position system (GPS). This is also the case with a geolocation based news feed. Content that is added into a search engine and is displayed in corresponding feeds by third parties or through direct distribution deals can be filtered and controlled through geographic location tagging that can involve geolocation and other forms of location positing.

In some embodiments, such functionality can be implemented by processing the contents of publications and corresponding messages and identifying geographic location information from such information. Metadata of publications and messages can also be parsed. Also, the processing of publications and corresponding messages to determine positioning and/or geolocation can be implemented using various types of machine learning or other artificial intelligence processes. Also, in some embodiments, users of a newsfeed can manually select a geographic location to filter search results and/or tag content produced by the users or a third party. Further, location of a user can be determined by simply using the GPS of the user's mobile device, and such location information can be used for tagging and filtering content in feeds as well.

One example benefit of being able to tag and filter online content such as provided herein is that such technologies enable efficient filtering of content as to whether it is local or remote, domestic or international, etc.

Other example benefits include reductions in use of memory, storage, and processing resources that are associated with conventional distribution channels of online content and newsfeeds.

In one example aspect, a server computer receives web content transmitted from a first client computer. And, the server indexes the received web content to be searchable. Also, the server receives a search query with a geographic location tag transmitted from a second client computer. And, the server computer, in response to receiving the search query with the geographic location tag, generates geographically filtered search results based on the search query and the geographic location tag. The geographically filtered search results include parts of the received web content corresponding to the search query and the geographic location tag. The server computer also transmits the geographically filtered search results to the second client computer to be displayed by the second client computer.

In some embodiments, the server computer filters the received web content, transmitted from the first client computer, based on a geographic location tag associated with the web content transmitted from the first client computer. In such embodiments, the geographically filtered search results include parts of the filtered web content corresponding to the search query and the geographic location tag of the search query. Also, the geographic location tag transmitted from the first client computer can be generated by the first client computer. In such embodiments, the generation of the geographic location tag by the first client computer can be in response to a manual input of a geographic location, in or near a part of the web content displayed by the first client computer. Also, the generation of the geographic location tag by the first client computer can be in response to an input of a geographic location generated by machine learning processing the web content. Also, the generation of the geographic location tag by the first client computer can be in response to an input of a geographic location generated by a global positioning system hosted at least in part by the first client computer such that the geographic location tag is indicative of a geographic location of the first client computer. Also, the generation of the geographic location tag by the first client computer can be in response to an input of a computer network address of the first client computer. The computer network address can include a static address and/or a dynamic address.

In some embodiments, the server computer receives geographic location tags of other web content from other users. In such embodiments, the filtering the web content transmitted from the first client computer can be further based on the geographic location tags of other web content from other users. Also, in such embodiments, the server computer can receive ratings of the other web content from the other users and the filtering of the web content transmitted from the first client computer is further based on the ratings of the other web content from the other users.

In some embodiments, the web content transmitted from the first client computer further includes a rating related to the web content. In such embodiments, the generating of the geographically filtered search results can be further based on the rating related to the web content.

In some embodiments, the geographic location tag of the search query is generated by the second client computer. In such embodiments, the generation of the geographic location tag of the search query can be in response to a manual input of a geographic location in a web browser displayed by the second client computer. Also, the generation of the geographic location tag of the search query can be in response to an input of a geographic location generated by a global positioning system hosted at least in part by the second client computer such that the geographic location tag is indicative of a geographic location of the second client computer. Also, the generation of the geographic location tag of the search query can be in response to an input of a computer network address of the second client computer. The computer network address can include a static address and/or a dynamic address.

In another example aspect, a server computer receives, from a second client computer, a geographic location based feed request for a feed of web content associated with a first user using a first user interface of a first client computer. The feed request includes a geographic location parameter. And, the server computer, forwards the feed request to the first client computer in response to receiving the feed request from the second client computer. Also, the server computer, receives the feed from the first client computer. And, in response to receiving the feed from the first client computer, the server computer filters the feed using a geographic location based filter that uses the geographic location parameter as input. Also, the server computer transmits the filtered feed to the second client computer to enable a second user interface of the second client computer to receive and display the filtered feed. The filtered feed includes at least a portion of the web content corresponding to the geographic location parameter.

In some embodiments, in response to receiving the feed of the web content associated with the first user from the first client computer, the server computer merely forwards the feed to the second client computer without the filtering of the feed by the server computer. In such embodiments, the filtering of the feed is performed by a geographic location based filter included in the second client computer, the first client computer, or another device external to the server computer.

In some embodiments, the geographic location parameter is generated by the second client computer, the server computer, and/or another device communicatively coupled to the second client computer. In such embodiments, the generation of the geographic location parameter is in response to a manual input of a geographic location, in or near a part of the second user interface displayed by the second client computer. Also, the generation of the geographic location parameter is in response to an input of a geographic location generated by machine learning processing the geographic location based feed request or other content or messages received, produced, and/or transmitted by the second user interface. Also, the generation of the geographic location parameter is in response to an input of a geographic location generated by a global positioning system hosted at least in part by the second client computer such that the geographic location tag is indicative of a geographic location of the second client computer. Also, the generation of the geographic location parameter is in response to an input of a computer network address of the second client computer. The computer network address includes a static address and/or a dynamic address.

In some embodiments, the server computer generates the first user interface to include a geographic location tagging feature that initiates the generation of the geographic location parameter, and provides the first user interface to the first client computer of the first user for display by a first web browser. Also, the server computer can generate the second user interface to include a geographic location tagging feature that initiates the generation of the geographic location parameter, and provides the second user interface to the second client computer of the second user for display by a second web browser.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 2C is another block diagram of a first client computer and a second client computer communicating with the server computer in accordance with an embodiment of the present disclosure;

FIGS. 4A-4F are exemplary screen shots of the user interface and the plug-in module when a web site is added to the server computer via the plug-in module in accordance with an embodiment of the present disclosure.

DESCRIPTION OF EMBODIMENTS

Figure 1A:
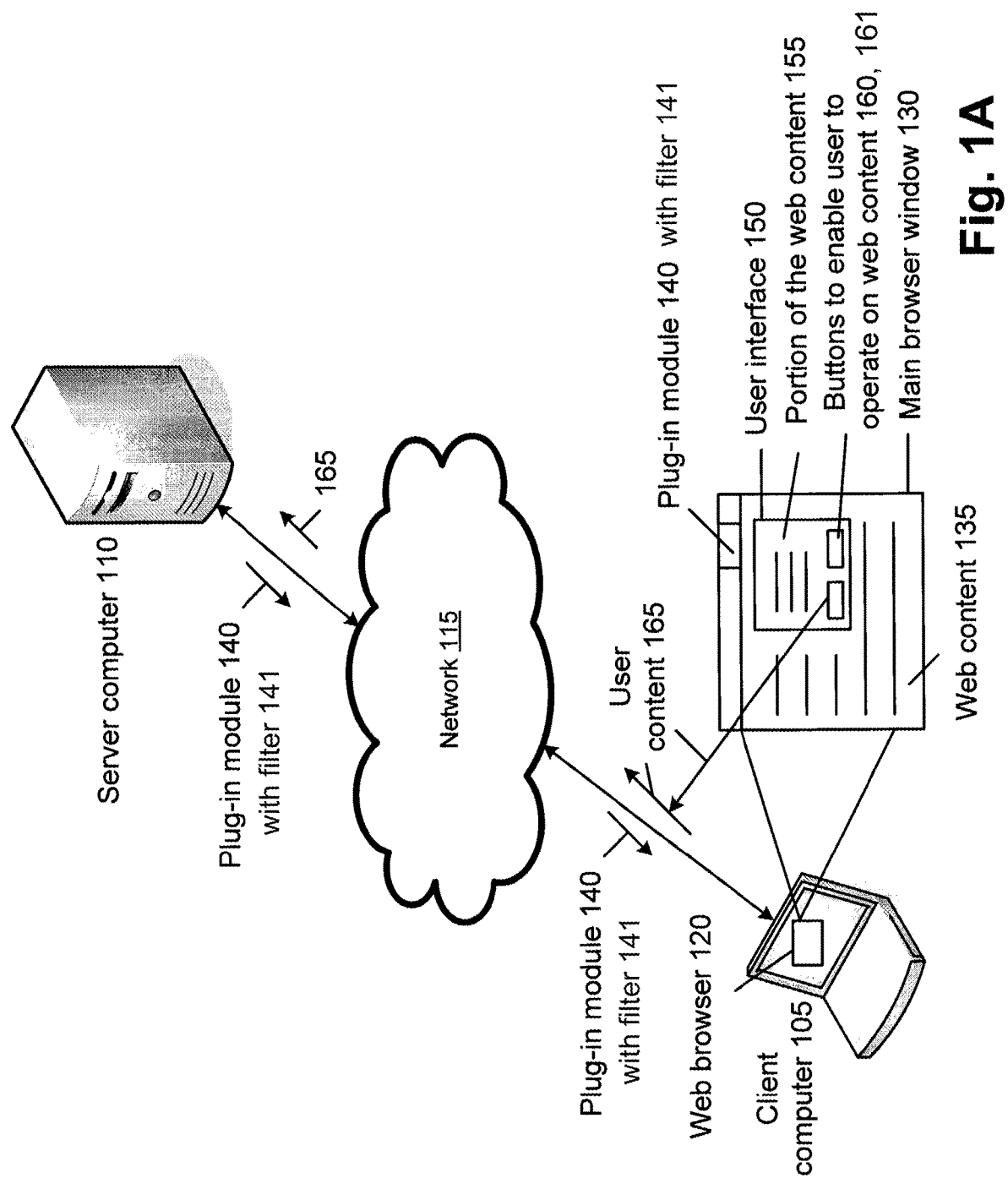
FIG. 1A is a block diagram of a client computer communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions (such as instructions 530 illustrated in FIG. 5). These computer program instructions can be provided to a processor of a general purpose computer (such as a processor of processing units 512 illustrated in FIG. 5), special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1A is a block diagram of an embodiment of a client computer 105 communicating with a server computer 110 over a network 115 such as the Internet. A user uses a web browser 120 on the client computer 105 to access the Internet. In one embodiment, a web page is transmitted via the network 115 to the client computer 105 for display by the web browser 120 in a main browser window 130. The web browser 120 displays web content 135 in the main window 130 of the web browser 120. The web content 135 is generally received from a third-party server different from the server computer 110 without going through the server computer 110. The third-party server is generally independent from the server computer 110; and the presentation of the web content from the third-party server to the web browser 120 is made without a reference to the server computer 110. However, the techniques described herein also apply to the scenario in which the web content 135 is from the server computer 110.

In one embodiment, the client computer 105 submits a request to the server computer 110 (e.g., via the web content 135) for a plug-in module 140 with a geographic location filter module 141. The plug-in module 140 may be associated with the web content 135, may be associated with another web page, and/or may be associated with a displayed advertisement. The server computer 110 transmits the plug-in module 140 to the browser 120 (to install the plug-in module 140 on the browser 120). In one embodiment, the plug-in module 140 is installed on the browser to present a user interface element such as a button on a toolbar of the web browser 120 (e.g., the browser toolbar or a third-party toolbar) or a menu item in the browser 120, etc.

The user of the client computer 105 can activate the plug-in module 140 by, for example, selecting the button for the plug-in module 140 (e.g., via a mouse cursor, touching the button, speaking a command, etc.). In one embodiment, upon activation, the plug-in module 140 causes the web browser 120 to display a user interface 150 separate from the main browser window 130 (e.g., a pop-up window). In one embodiment, the user interface 150 displays at least a portion of the web content 155 to the user and enables the user to operate on the displayed web content 155 (and, e.g., generate user content associated with the web content 135, such as a rating, comment, etc. as described below). In one embodiment, the user interface 150 includes one or more buttons 160 to enable the user to operate on the portion of the web content 155. In one embodiment, the plug-in module 140 transmits user content 165 to the server computer 110 (e.g., for indexing and/or for geographic location tagging). The buttons 160 include one or more buttons 161 to enable the user to tag the portion of the web content 155 with a geographic location parameter. The geographic location parameter inputted by the user allows the filter module 141 to identify that the user content 165 is associated with a corresponding geographic location and pass along the geographic location parameter to the server 110 that can perform further geographic location tagging.

For purposes of this disclosure, a computer such as the client computer 105 includes a processor and memory for storing and executing program code, data and software. Computers can be provided with operating systems that allow the execution of software applications in order to manipulate data. Client computer 105 can be any device that can display a website and that can be used by a user. Personal computers, servers, personal digital assistants (PDAs), wireless devices, smartphones, cellular telephones, tablet computers, interne appliances, media players, home theater systems, and media centers are several non-limiting examples of computers.

For the purposes of this disclosure, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. A number of program modules and data files can be stored on a computer readable medium of the server. They can include an operating system suitable for controlling the operation of a networked server computer, such as the WINDOWS 7, WINDOWS VISTA, or WINDOWS XP operating system published by Microsoft Corporation of Redmond, Wash., or the Ubuntu operating system distributed by Canonical Ltd. of Douglas, Isle of Man.

In one embodiment, the server computer 110 is a group of servers, such as one server to receive the submitted user content transmitted from the plug-in module 140 and a second server configured to download/install the plug-in module 140 into the user's web browser 120. In another embodiment, server computer 110 performs both of these functions. In one embodiment, a third server may be present in FIG. 1A representing a third-party web server on the Internet (e.g., an online newspaper site, a blog, etc.) that is separate and distinct from server computer 110.

Figure 1B:
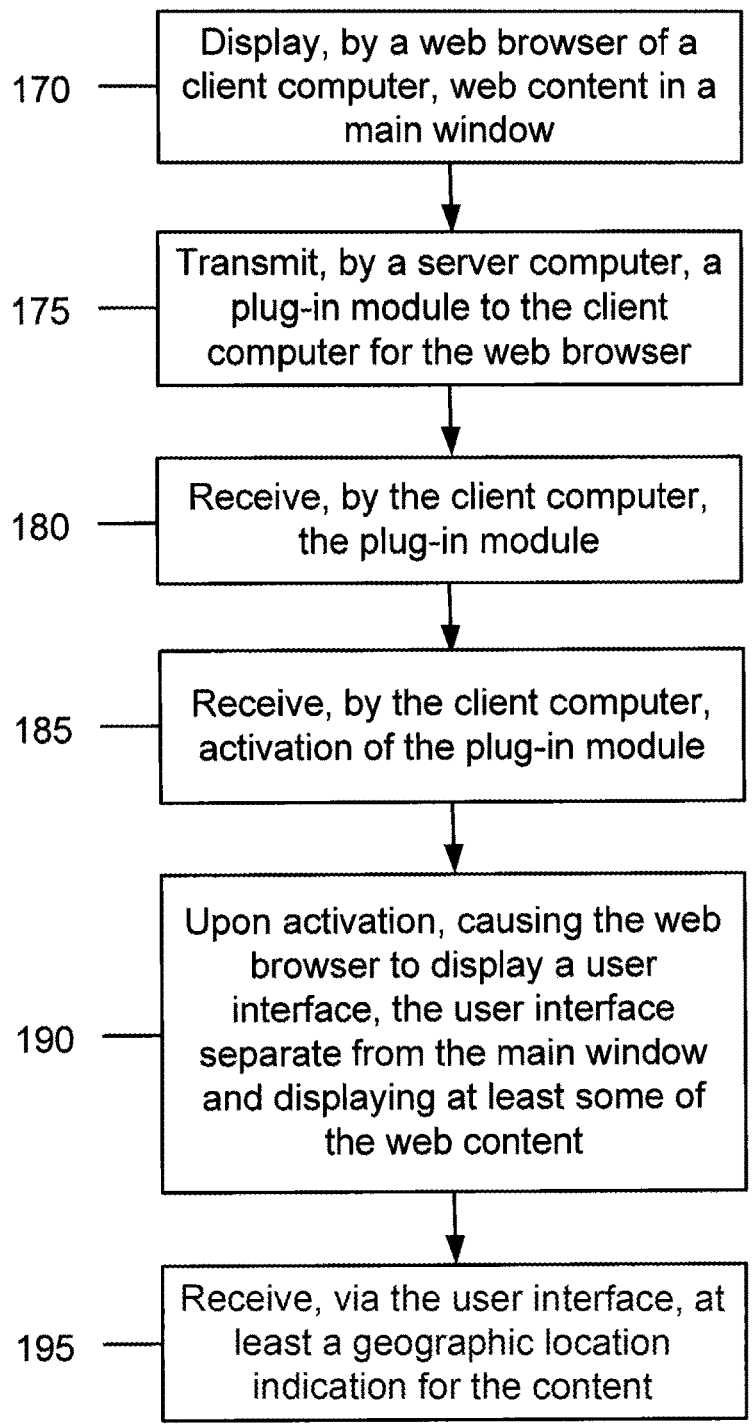
FIG. 1B is a flowchart illustrating operations performed by the server computer and the client computer to enable a user of the client computer to operate on web content displayed by the client computer in accordance with an embodiment of the present disclosure.

FIG. 1B is a flowchart illustrating an embodiment of operations performed by the server computer 110 and the client computer 105 to enable a user of the client computer 105 to operate on web content displayed by the browser 120. The user uses the web browser 120 to view and/or listen to web content 135, such as a web page, an audio file, a video, a post, a media file, etc., in main browser window 130 (Operation 170). In one embodiment, the plug-in module 140 is installed prior to and independent from the web content 135; the installation of the plug-in module 140 and its operation requires no prior arrangement made in the web content 135; and thus, the plug-in module 140 can work with any web content 135 found in the web. Alternatively, the web content 135 (e.g., a web page associated with the server computer 110) enables the user to install plug-in module 140. In another embodiment, the web page 135 is a third-party web page that includes an advertisement to install the plug-in module 140.

The server computer 110 transmits the plug-in module 140 to the web browser 120 of the client computer 105 (Operation 175) and the client computer 105 receives the plug-in module 140 (Operation 180). In one embodiment, the plug-in module 140 allows the user to remotely log into the server computer 110. Upon activation of the plug-in module 140 (Operation 185), the plug-in module 140 causes the web browser 120 to display user interface 150 separate from the main window 130. In one embodiment, the user interface 150 displays at least a portion of the web content 155 that the web browser 120 is displaying in its main window 130 (Operation 190). For example, the user interface 150 can display representative information of the web content 135, such as a picture, an icon, a sentence, and/or a paragraph in the portion of the web content 155. In one embodiment, the user interface 150 displays notifications, comments, or reviews from other users who have downloaded the plug-in module 140.

In one embodiment, the user interface 150 automatically selects for display the portion of the web content 155 from the received web content 135. Further, in one embodiment the user of the client computer 105 can provide settings as to what the user interface 150 will display when web content 135 is displayed in the web browser 120 (e.g., display the first few sentences of the web content 135, display the first graphic and first few sentences of web content 135, or display the entire web content 135, e.g., the corresponding web page).

The plug-in module 140 enables the user to operate on the web content 155. For example, the user can submit a geographic location parameter for the web content 155 and/or a rating for the web content 155 or a comment on the web content 155 (Operation 195) (e.g., user content 165). In one embodiment, the user interface 150 enables the user to post the portion of the web content 155 to a social networking site (e.g., FACEBOOK®). In one embodiment, the user interface 150 displays current discussions related to the web content 155 and enables the user to add the web content 135 to a search engine associated with the server computer 110. In one embodiment, the user can use the user interface 150 to adjust (e.g., add web content to or remove web content from) the portion of the web content 155 displayed by the user interface 150. For example, the plug-in module 140 can transmit the URL of the web content 135 to the server computer 110. The server computer 110 can update what is displayed by or the amount of web content 155 displayed by the user interface 150. In one embodiment, the plug-in module 140 prompts the user to add the web content 135 to (e.g., a web page) to the server computer's index so that the web content 135 (e.g., a web page) will be present in future search results. The plug-in module 140 may transmit the URL of the web content 135 (e.g., a web page) to the server computer 110 (which can then extract the web content 135), may transmit the entire web content 135 (e.g., a web page) to the server computer 110, or may transmit a portion of the web content 135 (e.g., a web page) to the server computer 110. In one embodiment, the server computer 110 (or the plug-in module 140) grabs the web page's meta-tags, thumbnail, title, and/or text of the web content 135 (e.g., a web page). In one embodiment, the plug-in module 140 allows the user to add web content 135 (e.g., a web page) to the server computer 110, such as via the user interface 150, a pop-up window, a menu option, right-clicking the webpage itself, via the browser 120, etc. In one embodiment, the plug-in module 140 enables the user to change the web content's tags in case the meta-tags are inaccurate.

Thus, the user interface 150 enables the user to provide information/content about a third-party web content 135 (e.g., a web page 135) to a web page associated with the plug-in module 140 (and server computer 110) while the third-party web page content 135 (e.g., a web page) is displayed in web browser 120. This information/user content 165 can include one or more comments, tips, a rating for the web content 155 (e.g., a score for the web content 155), an indication that the user likes or dislikes the web content 155, a recommendation for or on the web content 155, and/or a tag for the web content 155. Further, the user interface 150 can enable the user to attach content to the web content 155, share the web content 155 with others, etc.

The plug-in module 140 allows the user to act on any web page that is currently being viewed by the user and, in one embodiment, transmits the user-created content (e.g., comments and ratings) in association with an identification of the web content to the server computer 110. After the plug-in module 140 is installed on the web browser 120 (e.g., via an installation web page that directs the user to download the plug-in module 140 for installation), the user can visit any third-party web site and click a button associated with the plug-in module 140 to create user content in association with the third-party web site and submit the user content to the server computer 110. The user does not have to visit the web site through the plug-in module 140 or user interface 150 but rather can navigate to the web site using the user's web browser 120. In one embodiment, the plug-in module 140 can be implemented as a built-in module of the web browser 120 (e.g., shipped by Microsoft Corporation as a built-in component of INTERNET EXPLORER®).

Thus, when a user is looking at a web page (e.g., a news article or a blog entry), and if the user is interested in acting upon it (e.g., to share it, to submit it to the server computer 110 for indexing, or to rank or comment on it), the user can click on the plug-in module button and then work on the user interface 150 that, in one embodiment, populates some of the fields automatically by automatically taking those contents (e.g., snippets) from the web content 135 (e.g., a web page) that the user is currently looking at (e.g., thumbnail image, the lead sentence, etc.). There is no need for any prior arrangement between the web page being acted upon and the plug-in module 140/server computer 110.

For example, a blog-related service may use such a plug-in module 140 to assist the blog author that blogs on news articles. When looking at the news article, the user clicks the plug-in button and the user interface 150 shows the blog template that has many fields pre-populated with content from the news article (e.g., a thumbnail icon image, a lead sentence, etc.). Thus, the user does not have to perform the copy and paste manually. The user can work on the user interface 150 to compose the remaining part of the blog entry about the news article, such as rating, comments, etc.

In one embodiment, the user interface 150 displays advertisements to the user, such as for one or more products. In one embodiment, the advertisements are transmitted to the browser 120 by the server computer 110. Alternatively, a third-party advertisement server can transmit advertisements to the user interface 150 for display. In one embodiment, the advertisements may be related to the portion of the web content 155 displayed by the user interface 150. The user interface 150 can also display statistics. For example, the user interface 150 can display statistics associated with the portion of the web content 155, statistics associated with the user (e.g., number of days since the user has downloaded the plug-in module 140, amount of web content that the user has commented on, amount of web content that the user has shared, amount of web content that the user has rated or ranked, number of and/or which other users the user has followed, number of and/or which other users have followed the user, etc.), statistics about the user interface 150, statistics about the plug-in module 140, statistics about other users associated with the plug-in module 140 (e.g., the number of users who have downloaded the plug-in module 140 and/or the number of users who have downloaded the plug-in module 140 and who have currently activated the plug-in module 140 to view a corresponding user interface), and/or statistics about any other information.

In one embodiment, the user interface 150 displays advertisements that are posted by other users who have downloaded the plug-in module 140. The advertisements can be, for example, an advertisement for a roommate, an advertisement to sell or buy a product, a classified jobs section, a dating section, etc. Thus, in one embodiment, a product manager at company XYZ can post a job position that is available at XYZ to the users of the plug-in module 140. As another example, suppose one user is using his web browser 120 to search for a new television set. In one embodiment, the plug-in module 140 can detect the user's searching and post an advertisement for a TV that another user in the community (e.g., another user who has downloaded the plug-in module 140) is selling.

Figure 2A:
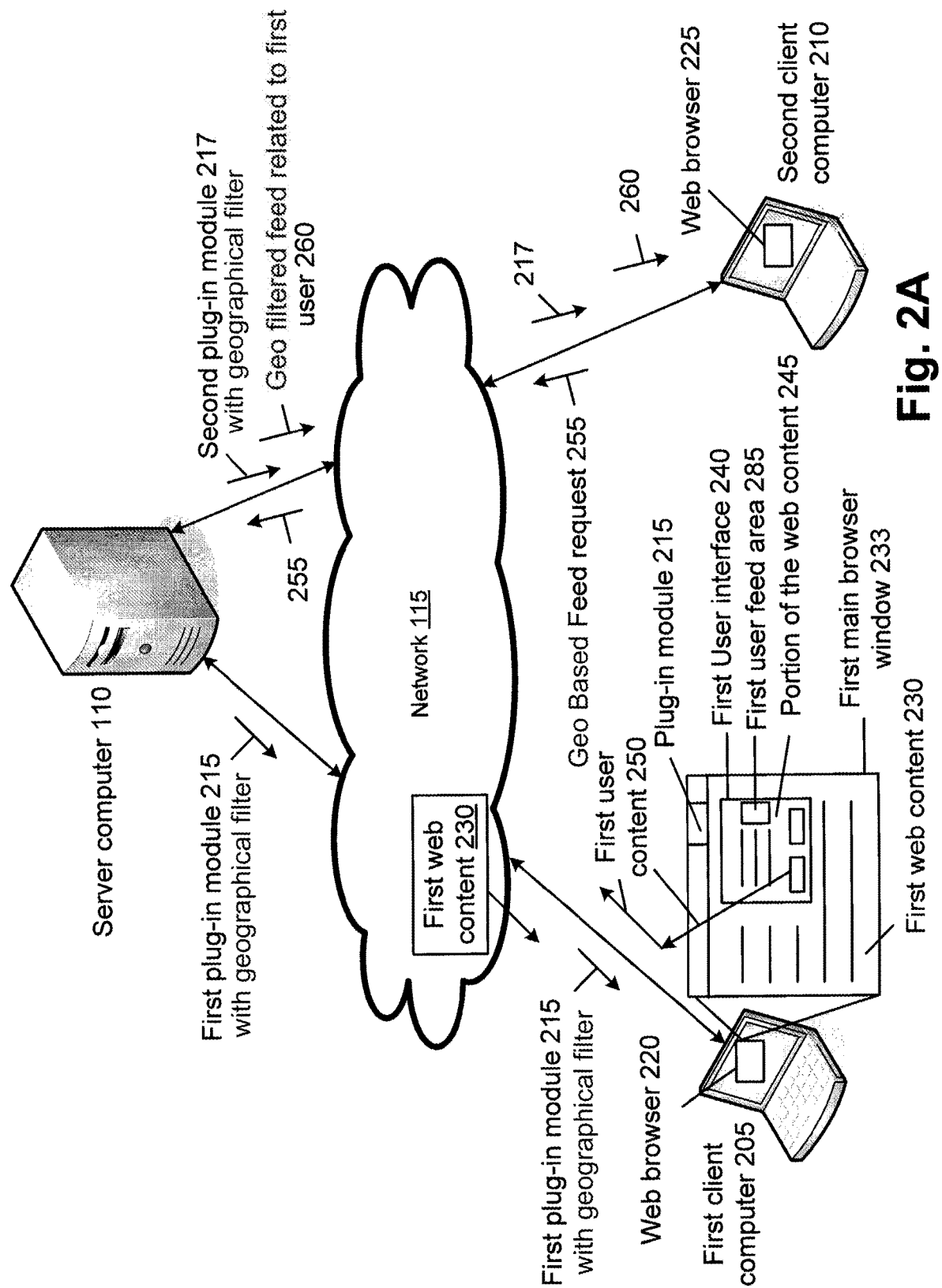
FIG. 2A is a block diagram of a first client computer and a second client computer communicating with the server computer in accordance with an embodiment of the present disclosure.
Figure 2B:
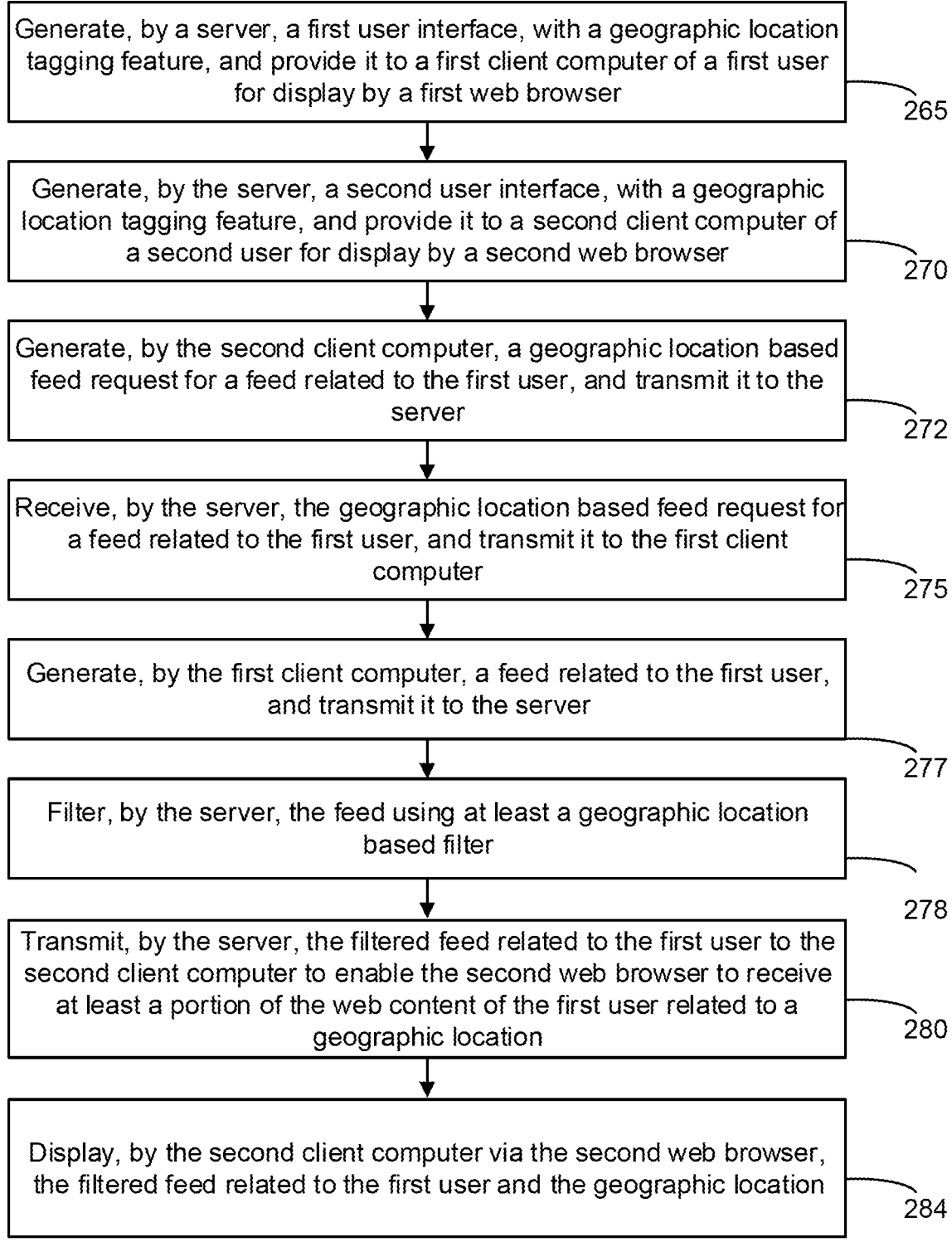
FIG. 2B is a flowchart illustrating operations performed by the server computer to transmit a geographic location filtered feed to the second client computer in accordance with an embodiment of the present disclosure.

FIG. 2A is a block diagram of an embodiment of a first client computer 205 and a second client computer 210 communicating with the server computer 110 over network 115. FIG. 2B is a flowchart of an embodiment of operations performed by the server computer 110, the first client computer 205, and the second client computer 210.

As described herein, in one embodiment the plug-in modules 215, 217 are transmitted to web browser 220 of the first client computer 205 and web browser 225 of the second client computer 210, respectively. Each web browser 220, 225 is displaying web content (e.g., the first web browser 220 is displaying first web content 230) as described herein in a main browser window (e.g., first main browser window 233). In one embodiment, the user of the first client computer 205 activates plug-in module 215 (which includes a geographic location tagging feature or filter), which in turn results in a corresponding first user interface 240 being displayed. Alternatively, the first user interface 240 is displayed in a web page served by the server computer 110 and geographic features and filters can be provided directly from the server computer. The first user interface 240 displays a portion of the web content 245. As described herein, the user of the first client computer 205 can enter the first web content 230 displayed by the web browser 220 of the first client computer 205 to generate first user content 250.

In one embodiment, the server computer 110 generates a first user interface 240, with a geographic location tagging feature, and provides the first user interface 240 to a first client computer 205 of a first user for display by a first web browser 220 (Operation 265). The server computer 110 generates a second user interface, with a geographic location tagging feature, and provides the second user interface to a second client computer 210 of a second user for display by a second web browser 225 (Operation 270). In one embodiment, the user interfaces (e.g., first user interface 240) provides a way for users to instantly (in real-time) share information that one user believes would be of special interest to another user. This may be done via feeds. Feeds can be used to alert other users of, for example, webpages, shared (ideas), tips, and photos. In one embodiment, the user interface takes a newsfeed entry and redirects it to another user's feed. In one embodiment, comments that are entered in a feed are updated (e.g., regularly), and entered comments can be found in a webpage discussion page. In one embodiment, the server computer 110 (user interface) does not generate duplicate entries.

In one embodiment, the second client computer 210 generates a geographic location based feed request 255 for a feed of web content associated with the first user, and transmits the geographic location based feed request 255 to the server computer 110 (Operation 272). The geographic location based feed request 255 can include input for the geographic location based filter (i.e., the geographic location parameter). The server computer 110 receives the feed request 255 and transmits the request 255 to the server computer 110 (Operation 275). In one embodiment, the first client computer 205, generates a feed of web content associated with the first user, and transmits the feed to the server computer 110 (Operation 277). In another embodiment, the server computer 110 generates the feed.

In one embodiment, in response to receiving the feed of the web content associated with the first user from the first client computer 205, the server computer 110 filters the feed using at least a geographic location based filter (Operation 278). In another embodiment, in response to receiving the feed from the first client computer 205, the feed is forwarded by the server computer 110 to the first client computer 205 without the filtering of the feed by the server computer. In such an example, the filtering of the feed is performed by at least a geographic location based filter of the first plug-in module 215 or the second plug-in module 217 which can be included in the first or second client computer respectively, or another device external to the server computer.

In one embodiment, the server computer 110 transmits the filtered feed associated with the first user 260 to the second client computer 210 to enable the second browser 225 to receive at least a portion of the first web content 230 of the first user related to a geographic location (Operation 280) (e.g., a thumbnail version of a picture from the web content, a sentence from the web content, and/or a link to or in the web content related to a specific geographic location). The geographic filtered feed can be sent in search results, newsfeed, and in a plug-in pop-up displayed by the user interface of the second client computer 210. In another embodiment, the users are provided with access to reply to the feed(s) and such replies can be geographically tagged by one of the plug-in modules; and thus, users can start a conversation using the feed(s) that are geographically relevant. The feed(s) serve as a way to communicate between a selected group of people in a geographically relevant manner. Users may also subscribe to certain tags, such as geographic tags, to receive feeds that are generated via an automatic search of the followed tags.

In one embodiment, the transmitting of the feed associated with the first user to the second client computer 210 to enable the second user to receive at least a portion of the web content further includes enabling the second user to reply to the at least a portion of the web content. In one embodiment, the transmitting of the feed includes transmitting search results including the at least a portion of the web content to the second user.

In one embodiment, the feed is transmitted to the second user interface in real-time when the second user has activated his corresponding user interface (e.g., has logged in or is displaying the user interface). In another embodiment, if the second user has not activated his user interface (e.g., via the plug-in module), the server computer 110 stores the feed and pushes the feed to the second client computer 210 when the second user activates the second user's plug-in module. Thus, in one embodiment the feed is similar to instant messaging and email. The presentation, in one embodiment, is similar to blog postings in blogs.

In one embodiment, the second client computer 210 displays, via the second web browser 225, the filtered feed associated with the first user and the geographic location (Operation 284).

In one or more embodiments, input for the geographic location based filter (i.e., the geographic location parameter) of one of the plug-in modules 215, 217, which is the basis for the filtering of the feed, is generated by the second client computer 210, the first client computer 205, or another device communicatively coupled to one of the client computers and/or the server computer 110. In such embodiment(s), the generation of the input for the geographic location based filter (i.e., the geographic location parameter) can be in response to a manual input of a geographic location, in or near a part of the second user interface displayed by the second client computer or the first user interface 240 displayed by the first client computer 205 (e.g., the manual input can be in or near the first feed area 285, the portion of the web content 245, the first web content 230 in the first browser window 233 of the first browser 220, or one of the similar parts in a second browser window of the second browser 225).

Also, the generation of the input for the geographic location based filter (i.e., the geographic location parameter) can be in response to an input of a geographic location generated by machine learning processing the geographic location based feed request 255 or other content or messages received, produced, and/or transmitted by the second user interface or the first user interface 240.

For the purpose of this disclosure, it is to be understood that machine learning is a subset of artificial intelligence in the field of computer science that often uses statistical techniques to give computers the ability to progressively improve performance on a specific task with data, without being explicitly programmed. Machine learning mentioned herein can include decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, learning classifier systems, and feature selection approach.

Also, the generation of the input for the geographic location based filter (i.e., the geographic location parameter) can be in response to an input of a geographic location generated by a global positioning system hosted at least in part by the second client computer 210 or the first client computer 205 such that the geographic location tag is indicative of a geographic location of the second client computer or the first client computer respectively. Also, the generation of the input for the geographic location based filter can be in response to an input of a computer network address of the second or first client computer. The computer network address can include a static address and/or a dynamic address. The computer network address can also include an IP address. Also, the network address can include any identifier for a node or host on a telecommunications or computer network. The network address can be a unique identifier across the network 115. Alternatively, in some embodiments, the network 115 can allow local, private addresses or locally administered addresses that are not globally unique. The network address can also include a special network address such as one allocated as a broadcast or multicast address.

In some embodiments, the server computer 110 generates the first user interface 240 to include a geographic location tagging feature (such in the first user feed area 285 or the portion of web content 245) that can initiate the generation of the input for the geographic location based filter (i.e., the geographic location parameter). The sever computer 110 can also provide the first user interface 240 to the first client computer 205 of the first user for display by a first web browser 220. Also, the server computer 110 can generate the second user interface in a browser window of the second browser 225 to include a geographic location tagging feature (such in a second user feed area or a second portion of web content) that initiates the generation of the input for the geographic location based filter. The sever computer 110 can also provide the second user interface to the second client computer 110 of the second user for display by the second web browser 225.

In one embodiment, the user interface enables a user to follow another user. For example, if the second user follows the first user, certain content of the first user is fed to the second user via a feed, and such content can also be filtered geographically be the server computer 110 or the geographic module of one of the plug-in modules 215, 217. In one embodiment, permissions are used for users as a way for users to control who can interact with them and how. Geographically based permissions can also be used for controlling the interactions. Users may register to follow other people to populate their feeds with relevant information and filter the information such as by geographic parameters. However, should a user find that another user that he/she is following to be too much of an annoyance for any reason, that user can block the user he/she is following in a number of ways. One way is to block the feed, which prevents the activities of a user that he/she is following from showing up on the feed. This can also be combined with the geographic tagging functionality in that the annoying user can be block only when that user is within or out of a certain distance from the client computer controlling the feed. In one embodiment, any user can message another user via the user interface. However, this can be a gateway to spamming, so by limiting the ability to message certain users, it can help create a better user experience. This is where geographic based filtering of content feeds and messaging can also be useful. If a user only accepts feeds from other computers a certain distance proximate to the user's computer then spam can be limited as much of spam originates from computers of great distance from the user's computer.

In one embodiment, the user interface includes a feed area (e.g., first user feed area 285) where a user can receive real-time information of what his/her followers are doing. And, the feed area can be further filtered by geographic filtering as described herein. For example, for webpage entries, users can rate, comment, and/or find external links to the pages in this feed area for local businesses and services. In one embodiment, there are two types of ratings—thumbs up (positive) and thumbs down (negative). In one embodiment, ratings can only be added once per user, per page/site/photo. A positive rating raises the page/site/photo's calculated score, which can cause it to appear higher in search results. This allows the users to directly decide what shows up in the highest positions in the search results. The ranking position can also be affected by geographic location of the source of the search results or locations associated with the search results. For instance, a greater distance from the user and/or a negative rating lowers the page/site/photo's calculated score, which can cause it to appear lower in the search results. This allows the users to directly decide what shows up in the lowest positions in the search results.

Commenting on an entry in a feed allows a user to express their opinion. In one embodiment, commenting can be done multiple times per user. And, such commenting can be parsed by the machine learning described herein used to geographically tag information. In one embodiment, all pages and photos displayed in the feed area are linked directly to their respective discussion pages and can be geographically tagged by content in the pages that provides geographic associations. Any comments posted on the feed area about the websites, webpages, photos, and albums can be updated on their respective discussion pages.

In one embodiment, if another user finds a comment particularly helpful, he/she can give the comment a positive rating. Similarly, in one embodiment, if another user finds a comment not particularly helpful, he/she can give the comment a negative rating. In one embodiment, a user can sort the way his feed area displays information.

In one embodiment, if a second user uses second client computer 210 that has the plug-in installed to visit the web content that has an associated user content (e.g., a snippet, a set of votes by different users and comments) in the server computer, the browser plug-in module shows the availability of the user content (e.g., the numbers of comments the server computer 110 stores for the web content displayed in the main window and the counts of up votes and down votes) and the second user can click on the browser plug-in module to activate a user interface to view the user content and/or provide additional user content.

The second user may use a search page of the server computer and/or the user interface of the plug-in module to search, based on the tags, to discover the web content and then view the user content using the plug-in module.

In one embodiment, the first user of the first user interface 240 may directly request the server computer 110 to feed the user content to a set of other users identified by the first user, such as the user of the second client computer 210. When the second client computer 210 is in a feed user interface, the server computer 110 and/or the plug-in module of the second client computer 210 automatically presents available feeds of user contents to the second user of the second client computer 210. The server computer 110 may automatically push feeds to the feed user interface (feed area), as soon as the feed content becomes available or updated. Alternatively, the feed user interface (feed area) may periodically check with the server computer 110 for updates and/or new feeds.

The available feeds include the user content that is explicitly identified by other users (e.g., the first user of the first client computer 205) for sharing with the second user, implicitly identified by the second user via subscription to tags identified by the second user, or implicitly identified by the second user via following one or more other users (e.g., the first user as a friend who accepts the request from the second user to follow the first user). When the second user follows the first user, the user contents of interest to the first user are fed to the second user in the feed user interface (feed area) (e.g., presented via activating the plug-in module). For example, the user contents related to the web content that are commented on, voted on, and/or discovered/submitted by the first user to the server computer 110 can be fed to the second user, if the second user follows the first user, as indicated by the user following data stored in the server computer 110. In one embodiment, different types of user contents (e.g., explicitly shared by the first user to the second user, implicitly shared via following the first user, and implicitly identified via subscription to tags) are presented in different sections of the feed user interface (feed area). Duplicated items are eliminated from the sections, based on a predetermined priority (e.g., if an item is presented in the explicit shared section, the item is not show in other sections).

When a first user explicitly requests the sharing of a user content with a second user in connection with web content, the server computer 110 generates a feed in response to the user request and makes the feed available as a real time response to the user request.

When a user content is created or updated for a web item (web content), the server computer 110 checks tag subscription data to create new feeds in real time with the creation or updating of the user content (for feeding to users who subscribe to a tag assigned to the web item); in addition, the server computer 110 checks the user following data to create new feeds in real time with the creation or updating of the user content (for feeding to users who follow 1) the user who created or updated the web item and/or 2) the users who subscribed to tags to receive a feed of the user content).

Figure 2D:
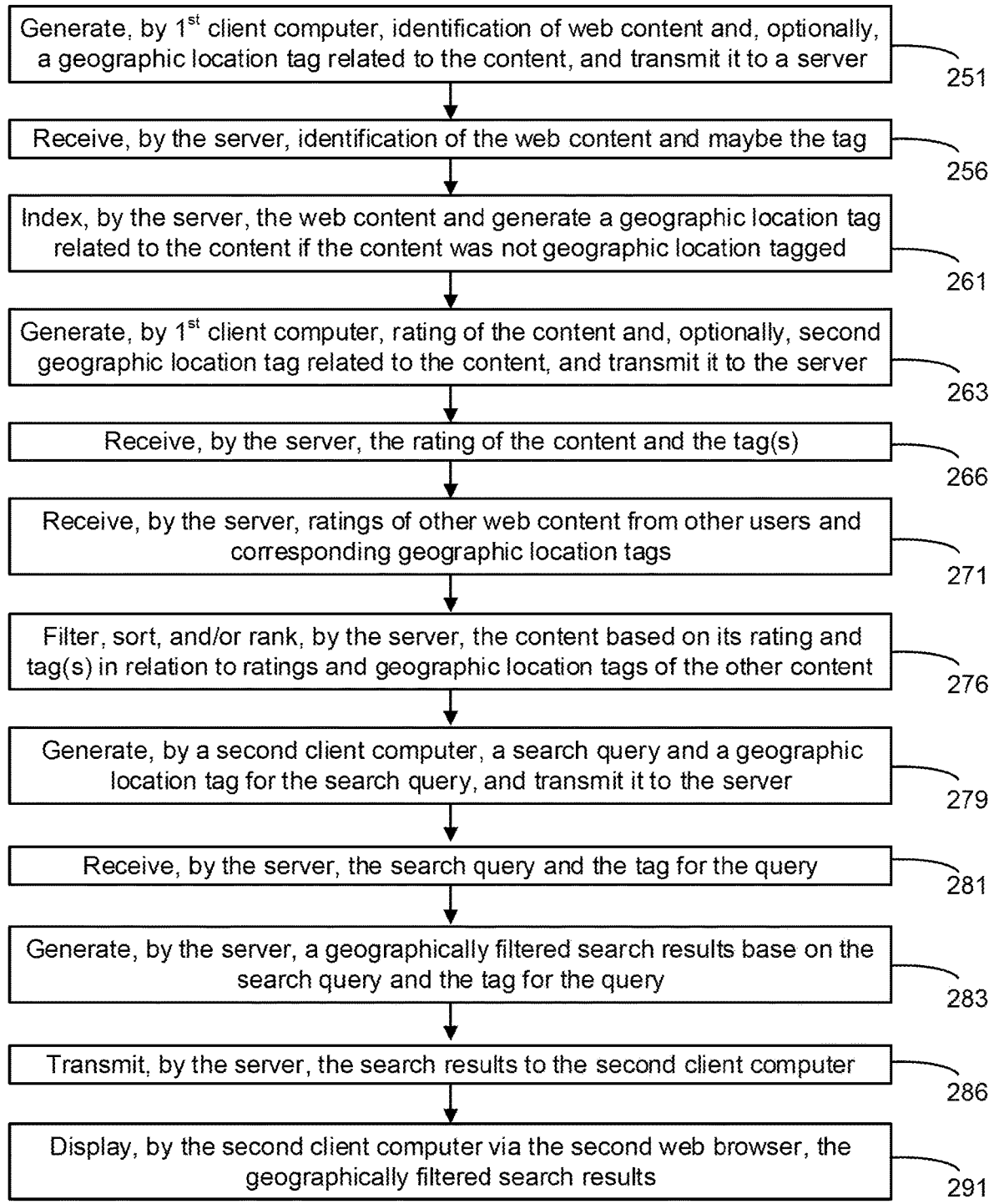
FIG. 2D is a flowchart illustrating operations performed by the server computer to enable a geographic location filtered search in accordance with an embodiment of the present disclosure.

FIG. 2C is a block diagram of an embodiment of a first client computer 205 and a second client computer 210 communicating with the server computer 110 over network 115. FIG. 2D is a flowchart of an embodiment of operations performed by the server computer 110, the first client computer 205, and the second client computer 210.

As described herein, in one embodiment the plug-in module, including the geographic location filter and other features, is transmitted to web browser 220 of the first client computer 205 and web browser 225 of the second client computer 210. Each web browser 220, 225 is displaying web content 135 as described herein. In one embodiment, the user of the first client computer 205 activates the plug-in module and thus the geographic location filter and other features, which in turn results in the corresponding user interface being displayed with geographic tagging and filtering capabilities. As described herein, the user of the first client computer 205 can act upon the web content displayed by the web browser 220 of the first client computer 205.

In one embodiment, the first client computer 205 generates an identification of web content 235 and, optionally, a geographic location tag related to the content, and transmits the identification of web content (and in some examples the geographic location tag) to the server computer 110 (Operation 251). In such an embodiment, the user of the first client computer 205 can submit an identification of web content 235 to the server computer 110 via the computer 205. In one embodiment, the submitting of this identification of web content 235 occurs when the user submits (via the user interface 150) a URL of the web page being displayed in the main window of the web browser 220 to the server computer 110. In one embodiment, the submitting of this identification of web content 235 occurs when the user submits user content 165 as described herein, such as the user submitting a geographic location parameter and/or a rating or ranking of the web content displayed by the web browser 220 in its main window 130, a user submitting a thumbnail version of a picture from the web content, a sentence from the web content, and/or a link to the web content. The first client computer 205 transmits the identification of web content 235 to the server computer 110. Additionally, or alternatively, a geographic location parameter submission can occur automatically according to a geographic location parameter associated with the first client computer 205. Other ways of tagging the identification of content 235 are also explained in greater detail herein.

In one embodiment, the server computer 110 receives, from the first client computer 205, the identification of web content 235 and in some examples also receives the geographic location parameter or tag (Operation 256). The server computer 110 indexes and/or geographically tags the web content 135 (Operation 261) for, for example, inclusion in search results and/or the server computer 110 generates a geographic location tag related to the content 165 or 135 if the content was not geographic location tagged in Operation 251 by the first client computer 205. In some embodiments, the geographic tagging can occur via the web content 135, the user content 165, or the indication of the web content 235. In one embodiment, the first client computer 205 generates a rating of the content 165 or 135 and, optionally, a second geographic location tag related to the content, and transmits such information to the server 110 (Operation 263).

In one embodiment, the server computer 110 receives a rating and/or a geographic location parameter or tag(s) (such as the one or more of the tags generated in Operations 251, 261, and 263) for the web content 135 from the first client computer 205 (Operation 266), such as receiving a rating and/or geographic location parameter that has been provided by the user in the user interface displayed by the plug-in module or provided by an automated process such as machine learning described herein or other forms of artificial intelligence. The server computer 110 also receives ratings and/or geographic location parameters from other users for other web content displayed by other user interfaces (Operation 271). The server computer 110 essentially receives ratings of other web content from other users and corresponding geographic location tags.

In one embodiment, if operation 261 has already been completed (i.e., the web content has already been indexed and/or geographically tagged by the server computer 110), the first client computer 205 can provide geographic location parameters for, comment on, provide ratings for, submit, etc. the web content. In one embodiment, the server computer 110 then ranks the web content from its geographic location parameters and/or rating in relation to the geographic location parameters and/or ratings of the other web content received from other users (Operation 276). Also, the server computer 110, can filter, sort, and/or rank the web content 135 and/or the user content 165 based on its rating and tag(s) in relation to ratings and geographic location tags of the other content from other users (Operation 276).

In one embodiment, the second client computer 210, generates a search query with a geographic location tag 282, and transmits the query with the tag to the server computer 110 Operation 279).

In one embodiment, the server computer 110 receives the search query with the tag 282 from the second client computer 210 (Operation 281). From another perspective, the user of the second client computer 210 transmits the search query with the geographic tag 282 to the server computer 110. The search query with the geographic tag 282 can include one or more geographic location tags manually or automatically inserted into the search query.

Alternatively, the tags can be included in metadata of the search query. Automation of insertion of geographic location tags can occur by machine learning described herein or other forms of artificial intelligence, or can occur manually by input from the user. For example, the tagging can be enhanced by decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, learning classifier systems, feature selection approach, and any combination thereof.

Again, the server computer 110 receives the search query with the tag 282 (Operation 281) and transmits geographically filtered search results 290 to the second client computer 210 (Operation 286). Prior to Operation 286, the server computer 110 generates the geographically filtered search results 290 base on the search query with the tag 282 (Operation 283). Finally, the second client computer 210 via the second web browser 225 can display the geographically filtered search results 290 (Operation 291).

In one or more embodiments, the server computer 110 filters the web content 135 or the identification of the web content 235 transmitted from the first client computer 205 based on a geographic location tag related to the web content or identification of the content transmitted from the first client computer. In such embodiments, the geographically filtered search results 290 include parts of filtered web content corresponding to the geographic location tag of the search query 282. Also, a geographic location tag transmitted from the first client computer 205 can be generated by the first client computer. In such embodiments, the generation of the geographic location tag by the first client computer 205 can be in response to a manual input of a geographic location, in or near a part of the user content 165 or the web content 135 displayed by the first client computer. Also, the generation of the geographic location tag by the first client computer 205 can be in response to an input of a geographic location generated by machine learning processing the web content. Machine learning processing to generate the input can include decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, learning classifier systems, feature selection approach, or any combination thereof.

Also, the generation of a geographic location tag by the first client computer 205 can be in response to an input of a geographic location generated by a global positioning system hosted at least in part by the first client computer such that the geographic location tag is indicative of a geographic location of the first client computer. Also, the generation of a geographic location tag by the first client computer 205 can be in response to an input of a computer network address of the first client computer. The computer network address can include a static address and/or a dynamic address. The computer network address can also include an IP address. Also, the network address can include any identifier for a node or host on a telecommunications or computer network. The network address can be a unique identifier across the network 115. Alternatively, in some embodiments, the network 115 can allow local, private addresses or locally administered addresses that are not globally unique. The network address can also include a special network address such as one allocated as a broadcast or multicast address.

Further, the generation of a geographic location tag can include a generation of the tag that is associated with search query 282.

In one or more embodiments, the server computer 110 receives geographic location tags of other web content from other users. In such embodiments, the filtering the web content transmitted from the first client computer 205 can be further based on the geographic location tags of other web content from other users. Also, in such embodiments, the server computer 110 can receive ratings of the other web content from the other users and the filtering of the web content transmitted from the first client computer 205 is further based on the ratings of the other web content from the other users. In one or more embodiments, the web content 135 or user content 165 transmitted from the first client computer 205 further includes a rating related to the web content. In such embodiments, the generating of the geographically filtered search results can be further based on the rating related to the web content 135 or the user content 165.

In some embodiments, the geographic location tag of the search query 282 is generated by the second client computer 210. In such embodiments, the generation of the geographic location tag of the search query 282 can be in response to a manual input of a geographic location in a web browser (such as browser 225) displayed by the second client computer 210. Also, the generation of the geographic location tag of the search query 282 can be in response to an input of a geographic location generated by a global positioning system hosted at least in part by the second client computer 210 such that the geographic location tag is indicative of a geographic location of the second client computer. Also, the generation of the geographic location tag of the search query 282 can be in response to an input of a computer network address of the second client computer 210. The computer network address can include a static address and/or a dynamic address. The computer network address can include an address for Network 115 as well. The computer network address can also include an IP address. Also, the network address can include any identifier for a node or host on a telecommunications or computer network. The network address can be a unique identifier across the network 115. Alternatively, in some embodiments, the network 115 can allow local, private addresses or locally administered addresses that are not globally unique. The network address can also include a special network address such as one allocated as a broadcast or multicast address.

In one embodiment, the geographically filtered search results 290 include identification of web content (e.g., a link to the web content) and associated user content. The geographically filtered search results 290 can also include metadata including data regarding parameters used for filtering the results geographically. By storing such parameters with the geographically filtered search results 290, processing for the geographic filtering can be reduced. In one embodiment, the search results 290 include web content in an order associated with the geographic location parameters and the ranking and/or ratings associated with the web content received by the server computer 110. Thus, unlike other search engines, such as GOOGLE® and BING®, which use bots/web crawlers to follow links in web pages to discover content and then sort the indexed content through an algorithm, the geographic location parameters and ranking of the web content in the geographically filtered search results 290 is based on human input (e.g., human ratings, such as like, dislike, or neutral) and/or artificial intelligence such as machine learning. Techniques can be used such as the machine learning techniques described herein to enhance search results so that they are more relevant with regard to geographic preferences or locations of the user. Also, the human input and/or artificial intelligence can affect the search results in real time. In one embodiment, the more people recommend a web page and/or the more people recommend a web page associated with a same geographic location associated with or selected by the user submitting the search query, the higher it shows up on a related search.

For example, the search results may be a page similar to GOOGLE® search result, where a list of results are shown, each having a snippet of the respective web content, the aggregated user rating, links to respective web content and the user comments, geographic location parameters, etc.

In one embodiment, the human user may specify geographic location parameters, a few keywords for the content identified by the user, and the content is indexed using the specified geographic location parameters and/or human identified keywords. The geographic location parameters and keywords may also be generated by an automated process such any one or more of the machine learning processes described herein. Human users may comment on the content, which augments the original content and then the location of the user may be used as well by the modules described herein. In one embodiment, the user interface allows a user to search for web pages and/or user added content via tags, such as geographic location parameter tags. Search results can be presented according to categories of the content (such as categories by geographic location) and/or sorted according to some criteria such as by geographic location parameters. In one embodiment, the geographically filtered search results 290 are displayed to the user by the plug-in module in the user interface. The plug-in module using the geographic locations filter module can also filter and sort the displayed results according to geographic location parameters.

Thus, the geographically filtered search results 290 may change in real time, as they depend on human input and/or artificial intelligence (e.g., geographic location indicating, rating, recommending, tipping, commenting, sharing, adding user content such as pictures, etc.) and not on links or a web crawler.

For example, in one embodiment the web content 135 comes from NYTimes.com or CNN.com which has no relation with server computer 110. When a user is browsing a CNN.com page and finds an interesting article at CNN.com/xyz.html, shown as the web content 135 in the main window 130 of the browser 220 in a typical browsing experience, the user may click the plug-in icon to call the plug-in module 140 into action. The plug-in module 140 gets the address of the web content 135—CNN.com/xyz.html—from the browser 220. The plug-in module 140 then gets the article either from the main browser window 130, or directly from CNN web server, or sends the address back to the server computer 110 to ask the server computer 110 to get the article from CNN.com/xyz.html. The address is used to obtain a snippet of the web content 155 (e.g., a thumbnail version of a picture from the article, a sentence or two from the article, a few keywords, etc.). The snippet 155 is populated into the user interface 150 to help the user create a "blog-entry" like submission to the server computer 110 to index the article with user content 165 (e.g., user selected keywords, rating, comments). The user does not have to do a copy/paste to create the submission. Once the article is indexed in the server computer 110, other users can search to find the article and view the user content 165 and add more user content 165 (e.g., their ratings and comments).

In one embodiment, once a web page has been added into the system (e.g., indexed by the server computer 110), it has no "positive rating" or "negative rating" by default. In this state, it has zero score. In one embodiment, ratings increase the score of a webpage. For example, a positive or short distance rating increases the score of a webpage by 1; and a negative or long distance rating increases the score of a webpage by 0.2. Other scores can also be used to differentiate the positive rating and negative rating. In one embodiment, items with more score are ranked higher up on the geographically filtered search results 290. These scores can be adjusted to improve search accuracy. In one embodiment, if two web pages have an equal score, the server computer 110 decides which web page shows up higher based on a number of factors, such as the geographic tags described herein, keywords, word combinations, frequency, etc. In one embodiment, by letting users control what articles they like, the server computer 110 delivers a more social search experience as well as cut down on spam.

For each web item (web content) (e.g., a web site, a video, a web page) hosted on the web/internet (typically not on the server computer 110), the server computer 110 allows its users to create user content 165, which typically includes a snippet or portion of the web content 155 (such as one or sentences from the web content 135, one or more thumbnail images of the web content 135, etc.). The snippet 155 is not generated until a user submits it to the server via the plug-in module 140. The user content 165 may further include a set of geographic based tags/keywords. The plug-in module 140 and/or the server 110 may automatically select the snippet and the geographic based tags/keywords 155 for the user, by processing the web content 135 in an automated way. The snippet and/or the geographic based tags/keywords 155 suggested by the plug-in module 140 and/or the server computer 110 may be modified by the user via the user interface 150 of the plug-in module 140. The snippet 155 is stored on the server computer 110 (as part of the user content 165 associated with the web content 135); and in one embodiment the user content 165 has a link to the web content 135, which allows the users of the server computer 110 to follow the link to see the actual/current version of the web content 135 that is on the web (typically not on the server computer 110). One or more users can add additional contents to the "user content" 165 associated with the web content 135, such as a vote/rating, and a comment. The first user submitting the snippet and/or geographic based geographic based tags/keywords can submit this information with his/her rating/vote and comment.

In one embodiment, if a second user uses the second client computer 210 that has the plug-in installed to visit the web content that has an associated user content (e.g., a snippet, a set of votes by different users and comments) in the server computer 110, the browser plug-in module shows the availability of the user content (e.g., the numbers of comments the server computer 110 stores for the web content displayed in the main window and the counts of up votes and down votes) and the second user can click on the browser plug-in module to activate a user interface to view the user content and/or provide additional user content. The second user may use a search page of the server computer and/or the user interface of the plug-in module to search, based on the geographic based tags, to discover the web content and then view the user content using the plug-in module.

All of the aforementioned features described with respect to FIGS. 1A, 1B, 2A, 2B, 2C, and 2D can be combined with any one of the geographic filtering or tagging features described herein.

Similarly, all of the following features described with respect to FIGS. 3A-3F and 4A-4F can be combined with any one of the geographic filtering or tagging features described herein.

Figure 3A:
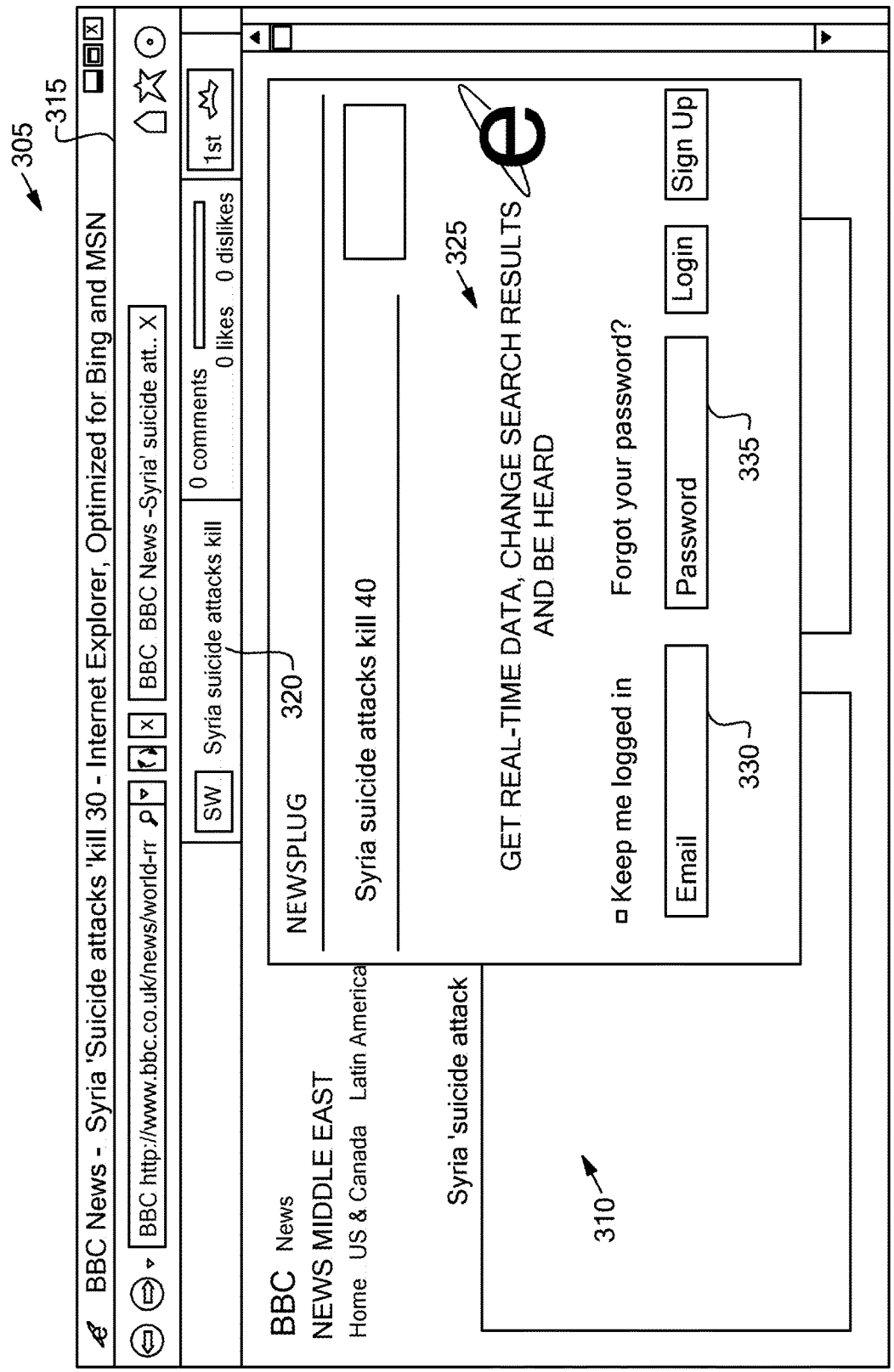
FIGS. 3A-3F are exemplary screen shots of a user interface and a plug-in module when a web page is added to the server computer via the plug-in module in accordance with an embodiment of the present disclosure.
Figure 3B:
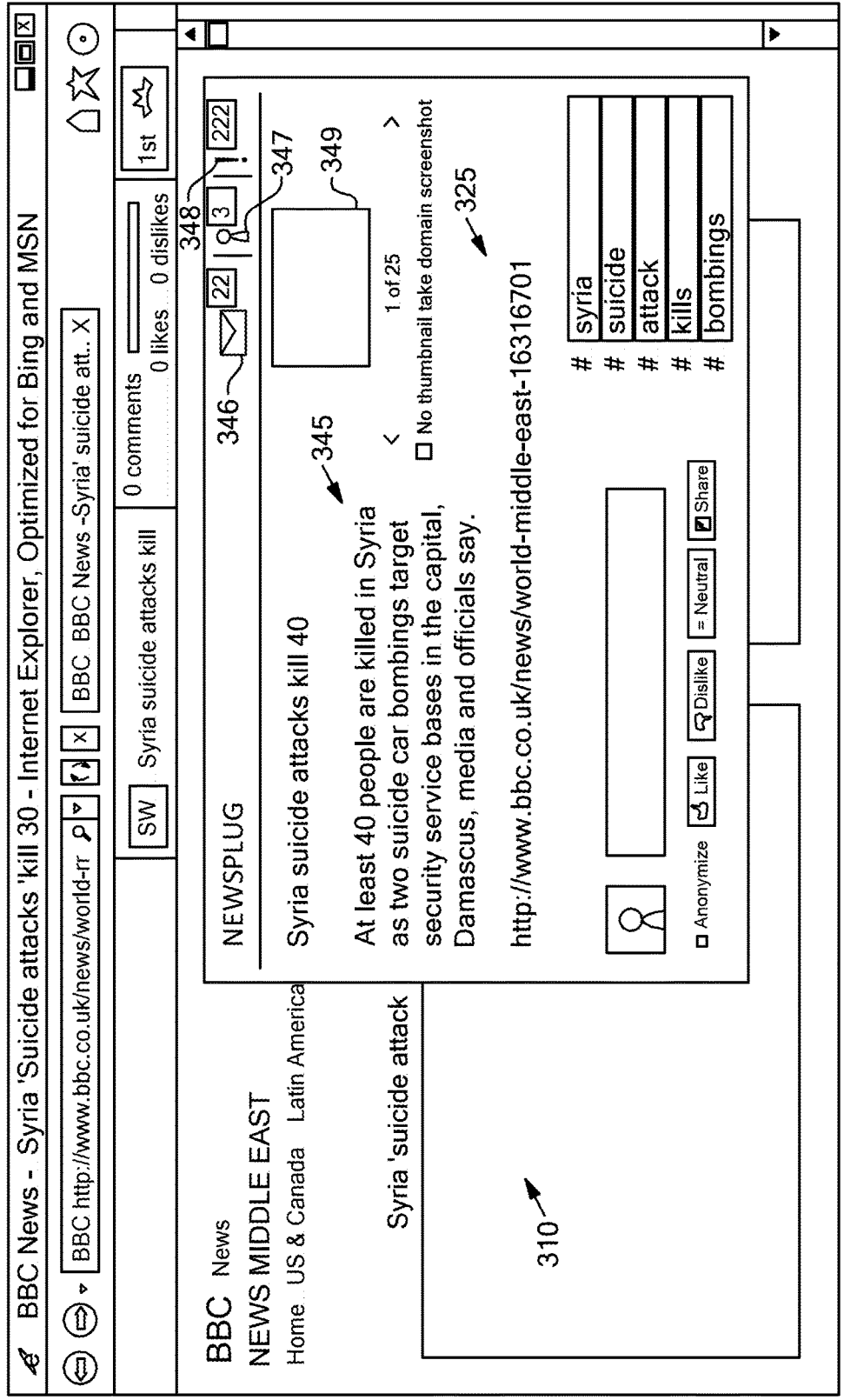

FIGS. 3A-3F are exemplary screen shots of the user interface and the plug-in module when a web page is added to the server computer 110 (e.g., added to be indexed for search results) via the plug-in module. In FIG. 3A, screen shot 305 shows web content 310 being displayed by web browser 315. The user has activated the plug-in module via plug-in module button 320, which results in user interface 325 being displayed. Screen shot 305 shows the user interface 325 enabling the user to log in via log-in input areas 330, 335. FIG. 3B shows a screen shot 340 illustrating the user interface 325 that includes a portion of the web content 345 associated with web content 310. The user in screen shot 340 can enter in a comment relating to the portion of the web content 345. The commenting can include notes related to geographic location, and the server computer 110 or the plug-in module is capable of identifying such notes and using such notes as input for the various geographic filtering and tagging functionality described herein.

In FIG. 3B, the envelop icon 346 with the number (22) may be an interface to open the section to see the explicitly shared feeds; the person icon 347 with the number (3) may be related to the user interface for following other users (and/or feeds via following); and the "!" icon 348 with the number (222) may be for feeds or for feeds via subscription to tags. In FIG. 3B, the thumbnails of all pictures are arranged in a slide show mode 349 to allow the user to view the pictures one at a time. The option below the slide show allows the user to select an alternative way to present the web page visually: generating a domain screenshot of the web page, instead of creating the thumbnail images of pictures in the web page (some web pages may not have a picture). The option to the left of the "like" voting button can be selected to submit the user content anonymously. The comment of the user submitted anonymously will be shown to others without revealing the identity of the user who requested to submit the comment with the "anonymize" option.

Figure 3C:
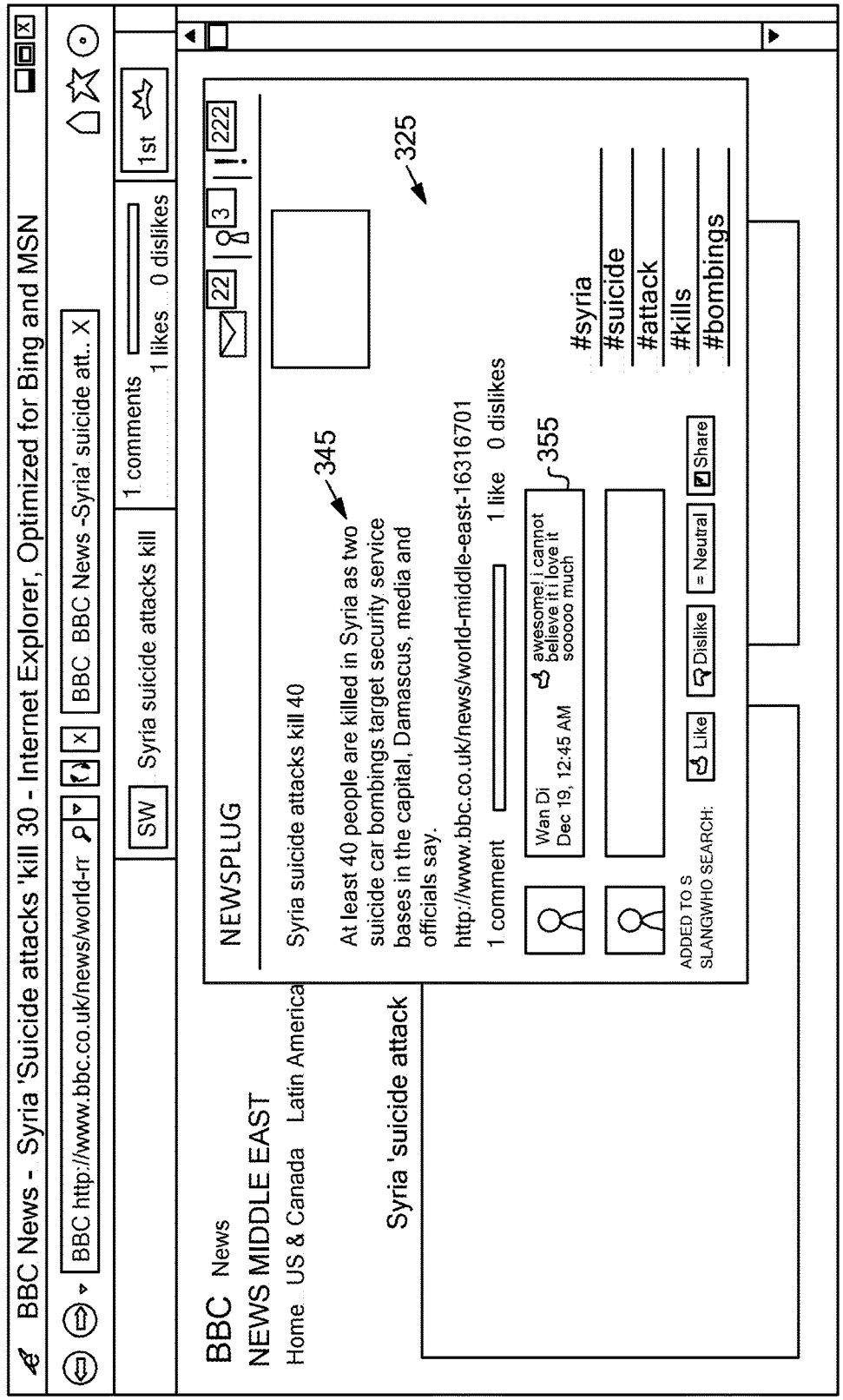
Figure 3D:
Figure 3E:
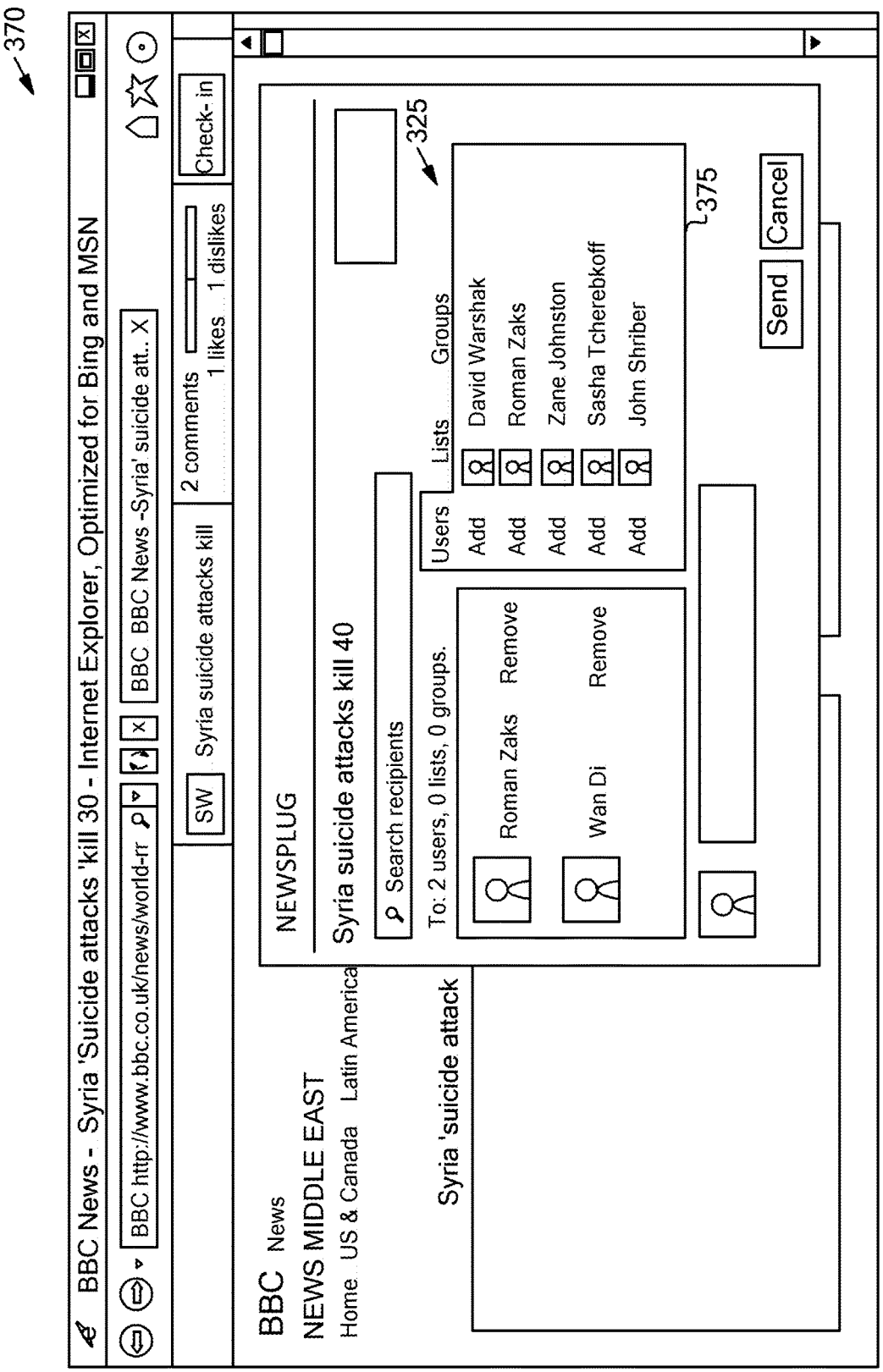
Figure 3F:
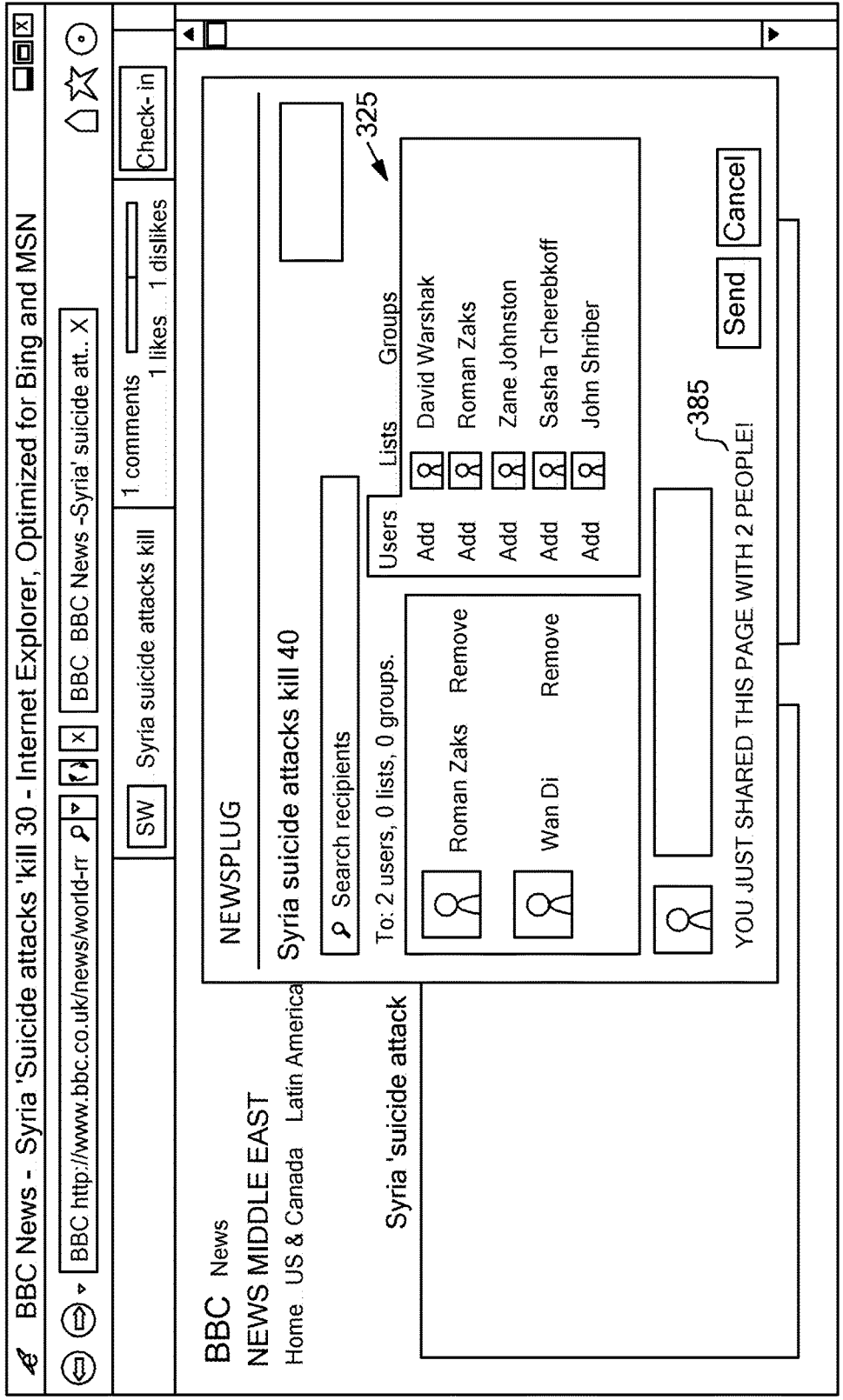

FIG. 3C shows a screen shot 350 that includes user interface 325 having a comment 355 from the user about the portion of the web content 345. The user has indicated that he/she "likes" the web content 345. FIG. 3D is a screen shot 360 of user interface 325 displaying two comments, the like comment 355 and a dislike comment 365. FIG. 3E shows a screen shot 370 with user interface 325 displaying contacts 375 that the user can share the web content 345 with. FIG. 3F shows a screen shot 380 with user interface 325 indicating via notification 385 that the user has shared the web content 345 with two people.

The interactions illustrated by FIGS. 3A-3F can be recorded and tagged and associated with geographic locations by the server computer 110 or the plug-in module, and such devices are also capable of identifying the resulting data from the recordings and tagging and using such data as input for the various geographic filtering and tagging functions described herein.

Figure 4A:
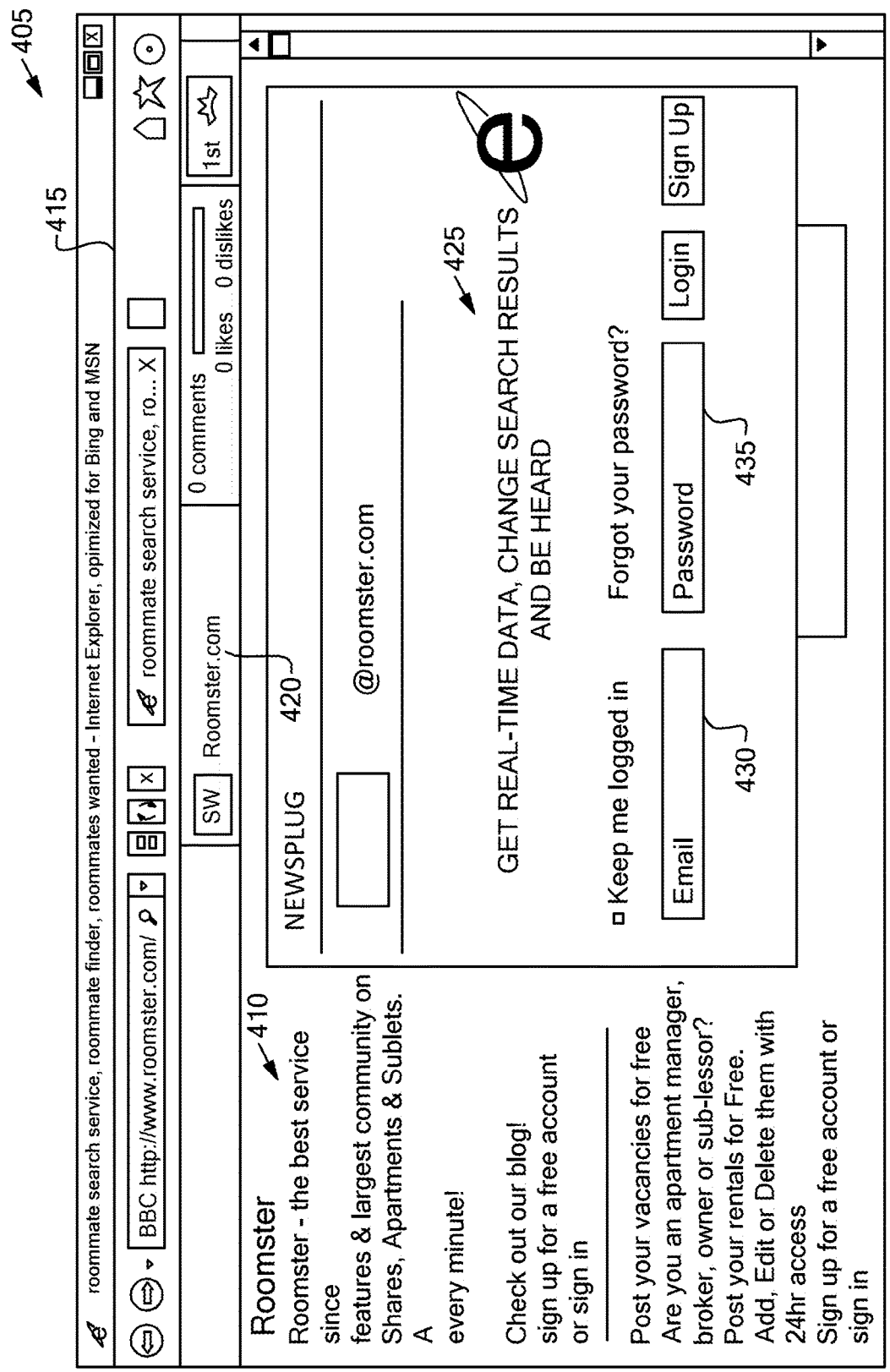
Figure 4E:
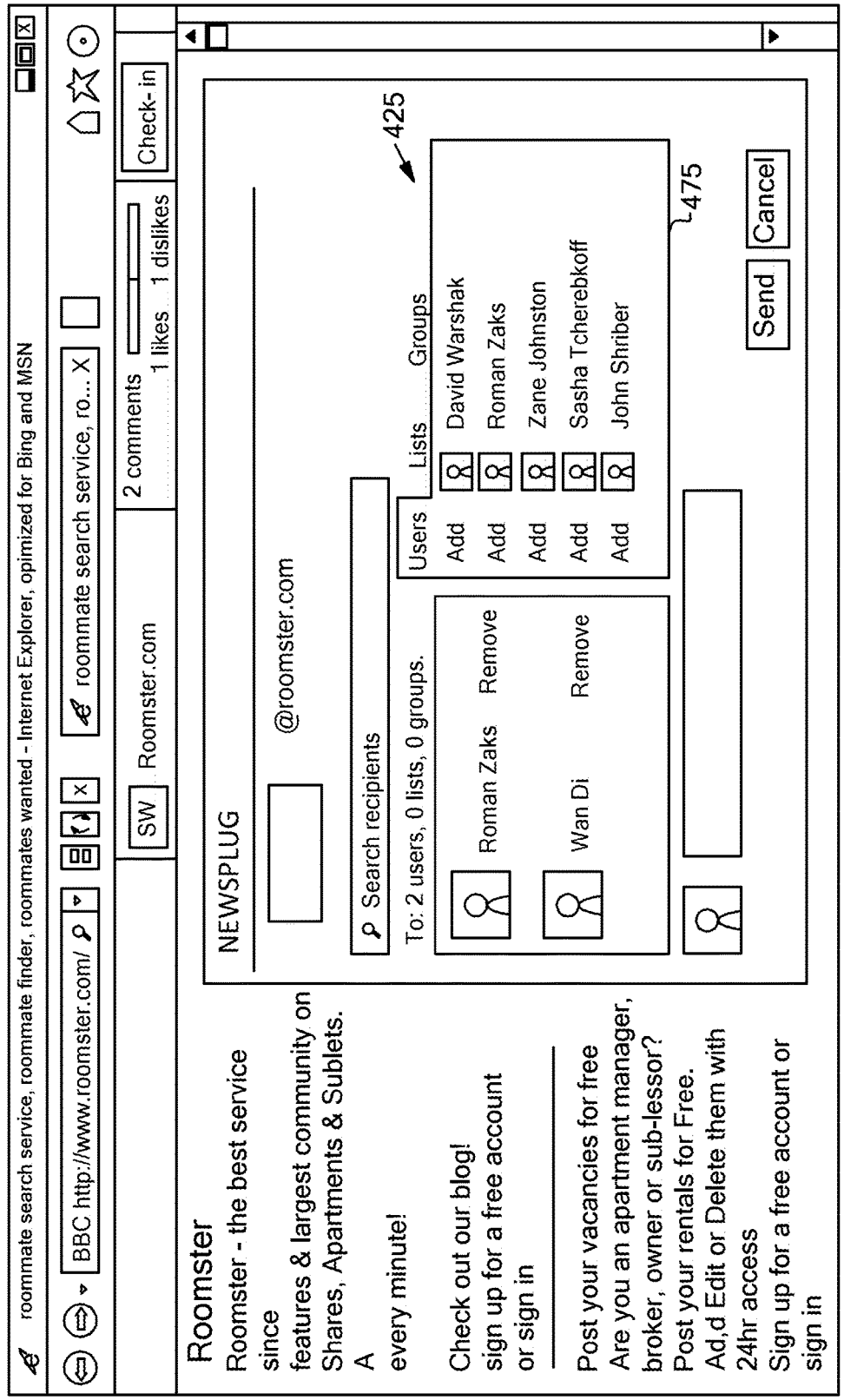
Figure 4F:
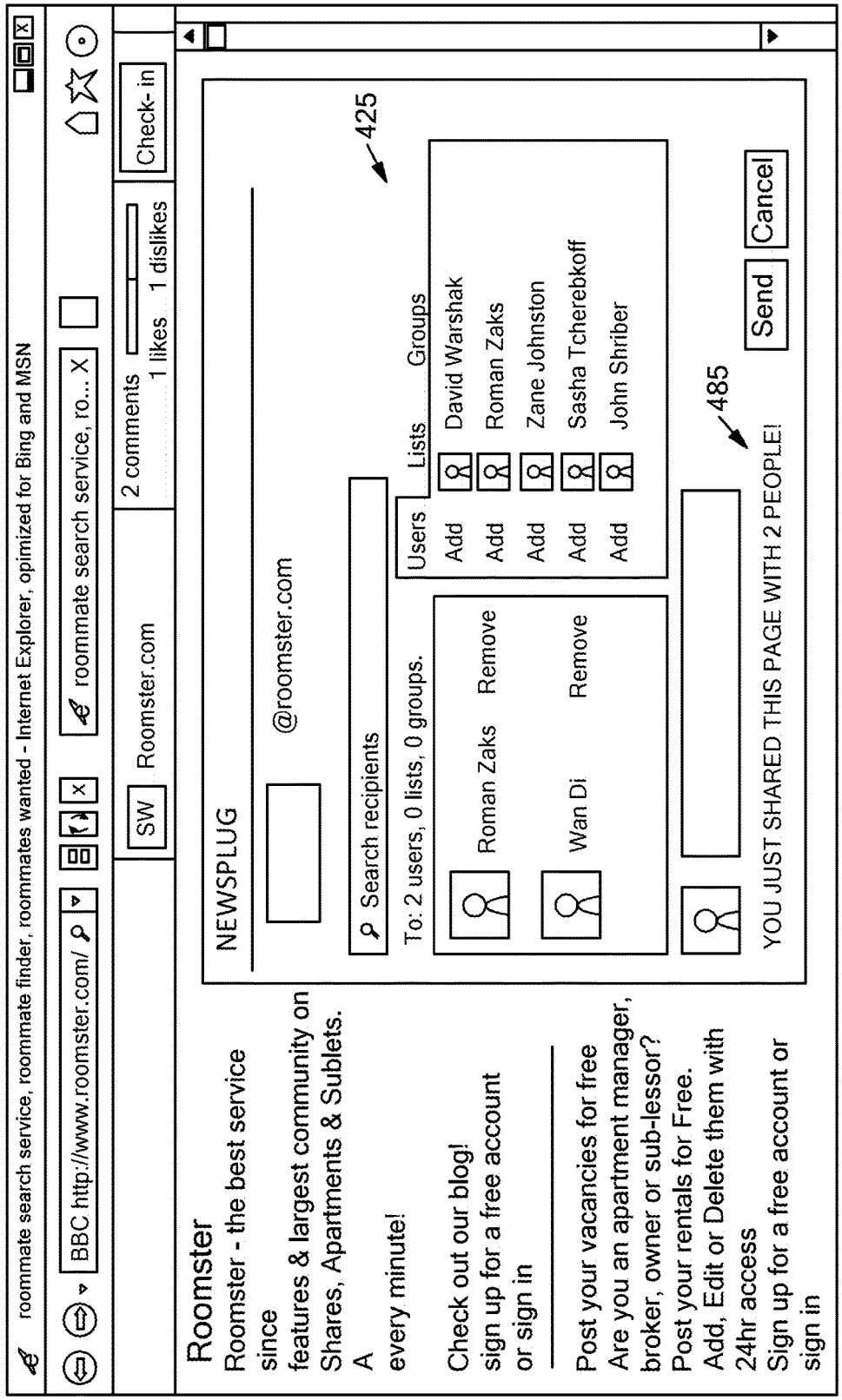

FIGS. 4A-4F are exemplary screen shots of the user interface and the plug-in module when a web site is added to the server computer 110 (e.g., added to be indexed for search results) via the plug-in module. In FIG. 4A, screen shot 405 shows web site 410 being displayed by web browser 415. The user has activated the plug-in module via plug-in module button 420, which results in user interface 425 being displayed. Screen shot 405 shows the user interface 425 enabling the user to log in via log-in input areas 430, 435. FIG. 4B shows a screen shot 440 illustrating the user interface 425 that includes a portion of the web site content 445 associated with web site 410. The user in screen shot 440 can enter in a comment relating to the portion of the web content 445. FIG. 4C shows a screen shot 450 that includes user interface 425 having a comment 455 from the user about the portion of the web site content 445. The user has indicated that he/she "likes" the web site content 445. FIG. 4D is a screen shot 460 of user interface 425 displaying two comments, the like comment 455 and a dislike comment 465. FIG. 4E shows a screen shot 470 with user interface 425 displaying contacts 475 that the user can share the web site content 445 with. FIG. 4F shows a screen shot 480 with user interface 425 indicating via notification 485 that the user has shared the web site content 445 with two people.

The interactions illustrated by FIGS. 4A-4F can be recorded and tagged and associated with geographic locations by the server computer 110 or the plug-in module, and such devices are also capable of identifying the resulting data from the recordings and tagging and using such data as input for the various geographic filtering and tagging functions described herein.

Figure 5:
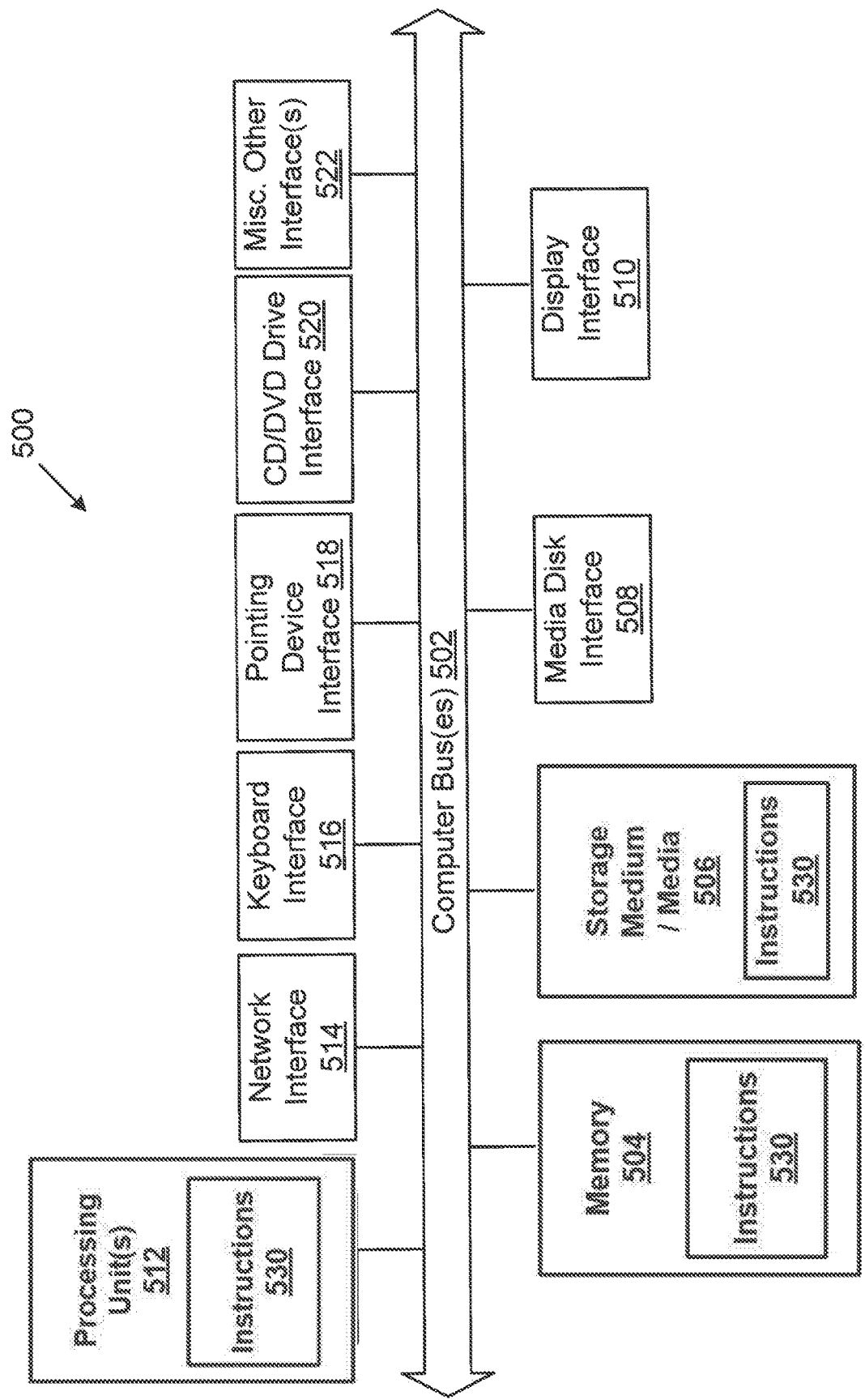
FIG. 5 is a block diagram illustrating an internal architecture of a computer in accordance with an embodiment of the present disclosure.

FIG. 5 is a block diagram illustrating an internal architecture of an example of a computer, such as server computer 110 and/or client computer 105, 205, or 210, in accordance with one or more embodiments of the present disclosure. A computer as referred to herein refers to any device with a processor capable of executing logic or coded instructions (such as instructions 530), and could be a server, personal computer, set top box, smart phone, pad computer or media device, to name a few such devices. As shown in the example of FIG. 5, internal architecture 500 includes one or more processing units (also referred to herein as CPUs) 512, which interface with at least one computer bus 502. Also interfacing with computer bus 502 are persistent storage medium/media 506, network interface 514, memory 504, e.g., random access memory (RAM), run-time transient memory, read only memory (ROM), etc., media disk drive interface 508 as an interface for a drive that can read and/or write to media including removable media such as floppy, CD-ROM, DVD, etc. media, display interface 510 as interface for a monitor or other display device, keyboard interface 516 as interface for a keyboard, pointing device interface 518 as an interface for a mouse or other pointing device, and miscellaneous other interfaces not shown individually, such as parallel and serial port interfaces, a universal serial bus (USB) interface, and the like.

Memory 504 interfaces with computer bus 502 so as to provide information (such as instructions 530) stored in memory 504 to CPU 512 during execution of software programs such as an operating system, application programs, device drivers, and software modules including the instructions 530 that include program code, and/or computer-executable process operations, incorporating functionality described herein, e.g., one or more of process flows described herein. CPU 512 first loads computer-executable process operations (such as the instructions 530) from storage, e.g., memory 504, storage medium/media 506, removable media drive, and/or other storage device. CPU 512 can then execute the stored process operations in order to execute the loaded computer-executable process operations. Stored data, e.g., data stored by a storage device, can be accessed by CPU 512 during the execution of computer-executable process operations.

Persistent storage medium/media 506 is a computer readable storage medium(s) that can be used to store software and data, e.g., an operating system and one or more application programs. Persistent storage medium/media 506 can also be used to store device drivers, such as one or more of a digital camera driver, monitor driver, printer driver, scanner driver, or other device drivers, web pages, content files, playlists and other files. Persistent storage medium/media 506 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions (such as instructions 530), data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions (such as instructions 530) and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method, implemented by a server computer, comprising:
    transmitting a plug-in module to a web browser of a first client computer, the web browser displaying web content in a main window,
        wherein the plug-in module, when activated, causes the web browser to display a user interface to a user of the first client computer, wherein the user interface is separate from the main window of the web browser, and
        wherein the plug-in module includes a geographic location filter module;
    receiving web content transmitted from the first client computer, the web content generated by the first client computer in the plug-in module;
    indexing the received web content to be searchable, wherein the indexing includes:
        determining whether the received web content included a first geographic location tag; and
        generating a second geographic location tag related to the received web content in response to determining the received web content did not include the first geographic location tag;
    transmitting the plug-in module to a second client computer;
    receiving a search query with a third geographic location tag transmitted from the second client computer via the plug-in module;
    in response to receiving the search query with the third geographic location tag, generating geographically filtered search results based on the search query and the third geographic location tag, wherein the geographically filtered search results include parts of the received web content corresponding to the search query and the third geographic location tag; and
    transmitting the geographically filtered search results to the second client computer to be displayed by the second client computer.

2. The method of claim 1, further comprising filtering the received web content based on the first geographic location tag associated with the web content transmitted from the first client computer, and wherein the geographically filtered search results include parts of the filtered web content corresponding to the search query and the third geographic location tag of the search query.

3. The method of claim 2, wherein the first geographic location tag transmitted from the first client computer is generated by the first client computer.

4. The method of claim 3, wherein the generation of the first geographic location tag by the first client computer is in response to at least one of:
    a manual input of a geographic location, in or near a part of the web content displayed by the first client computer;
    an input of a geographic location generated by machine learning processing the web content;
    an input of a geographic location generated by a global positioning system hosted at least in part by the first client computer such that the first geographic location tag is indicative of a geographic location of the first client computer; and
    an input of a computer network address of the first client computer, wherein the computer network address includes at least one of a static address and a dynamic address.

5. The method of claim 2, further comprising receiving geographic location tags of other web content from other users, and wherein the filtering the web content transmitted from the first client computer is further based on the geographic location tags of other web content from other users.

6. The method of claim 5, further comprising receiving ratings of the other web content from the other users, and wherein the filtering the web content transmitted from the first client computer is further based on the ratings of the other web content from the other users.

7. The method of claim 1, wherein the web content transmitted from the first client computer further includes a rating related to the web content, and wherein the generating of the geographically filtered search results is further based on the rating related to the web content.

8. The method of claim 1, wherein the third geographic location tag of the search query is generated by the second client computer.

9. The method of claim 8, wherein the generation of the third geographic location tag of the search query is in response to a manual input of a geographic location in a web browser displayed by the second client computer.

10. The method of claim 8, wherein the generation of the third geographic location tag of the search query is in response to an input of a geographic location generated by a global positioning system hosted at least in part by the second client computer such that the third geographic location tag is indicative of a geographic location of the second client computer.

11. The method of claim 8, wherein the generation of the third geographic location tag of the search query is in response to an input of a computer network address of the second client computer, wherein the computer network address includes at least one of a static address and a dynamic address.

12. A non-transitory computer readable storage medium storing computer program instructions configured to instruct a computer processor to perform at least:
receiving, via a network interface communicatively coupled to the computer processor, from a second client computer, a geographic location based feed request for a feed of web content associated with a first user using a first user interface of a first client computer, the feed request including a geographic location parameter;
forwarding, via the network interface, the feed request to the first client computer in response to receiving the feed request from the second client computer;
receiving, via the network interface, the feed from the first client computer, wherein the feed is an unfiltered feed;
transmitting, via the network interface, the unfiltered feed to the second client computer to enable a second user interface of the second client computer to receive and display a filtered feed, the filtered feed including at least a portion of the web content corresponding to the geographic location parameter,
wherein in response to receiving the feed from the first client computer, filtering the feed using a geographic location based filter that uses the geographic location parameter as input, wherein the filtering of the feed is performed by a geographic location based filter included in the second client computer.

13. The non-transitory computer readable storage medium of claim 12, wherein the geographic location parameter is generated by the second client computer, a server computer, and/or another device communicatively coupled to the second client computer.

14. The non-transitory computer readable storage medium of claim 13, wherein the generation of the geographic location parameter is in response to a manual input of a geographic location, in or near a part of the second user interface displayed by the second client computer.

15. The non-transitory computer readable storage medium of claim 13, wherein the generation of the geographic location parameter is in response to an input of a geographic location generated by machine learning processing the geographic location based feed request or other content or messages received, produced, and/or transmitted by the second user interface.

16. The non-transitory computer readable storage medium of claim 13, wherein the generation of the geographic location parameter is in response to an input of a geographic location generated by a global positioning system hosted at least in part by the second client computer such that the geographic location parameter is indicative of a geographic location of the second client computer.

17. The non-transitory computer readable storage medium of claim 13, wherein the generation of the geographic location parameter is in response to an input of a computer network address of the second client computer, wherein the computer network address includes at least one of a static address and a dynamic address.

18. The non-transitory computer readable storage medium of claim 12, further comprising generating the second user interface to include a geographic location tagging feature that initiates the generation of the geographic location parameter, and providing the second user interface to the second client computer for display by a second web browser.

19. A computing device comprising:
at least one processor; and
a storage medium tangibly storing thereon program logic configured to instruct the at least one processor to at least:
transmit a plug-in module to a web browser of a first client computer, the web browser displaying web content in a main window,
wherein the plug-in module, when activated, causes the web browser to display a user interface to a user of the first client computer, wherein the user interface is separate from the main window of the web browser, and
wherein the plug-in module includes a geographic location filter module;
receive web content transmitted from the first client computer, the web content generated by the first client computer in the plug-in module;
index the received web content to be searchable, wherein the at least one processor is configured to:
determine whether the received web content included a first geographic location tag;
generate a second geographic location tag related to the received web content in response to determining the received web content did not include the first geographic location tag;
transmit the plug-in module to a second client computer;
receive a search query with a third geographic location tag transmitted from the second client computer via the plug-in module;
in response to receiving the search query with the third geographic location tag, generate geographically filtered search results based on the search query and the third geographic location tag, wherein the geographically filtered search results include parts of the received web content corresponding to the search query and the third geographic location tag; and direct a transmitter of the computing device to transmit the geographically filtered search results to the second client computer to be displayed by the second client computer.

* * * * *